United States Patent
Safaee-Rad et al.

(10) Patent No.: US 9,934,595 B2
(45) Date of Patent: Apr. 3, 2018

(54) WHITE POINT CALIBRATION AND GAMUT MAPPING FOR A DISPLAY

(71) Applicant: QUALCOMM Incorporated, San Diego, CA (US)

(72) Inventors: Reza Safaee-Rad, Etobicoke (CA); Jennifer Lee Gille, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 15/096,871

(22) Filed: Apr. 12, 2016

(65) Prior Publication Data

US 2017/0140556 A1 May 18, 2017

Related U.S. Application Data

(60) Provisional application No. 62/254,705, filed on Nov. 12, 2015.

(51) Int. Cl.
| | |
|---|---|
| *G09G 5/02* | (2006.01) |
| *G06T 11/00* | (2006.01) |
| *G09G 3/20* | (2006.01) |
| *G09G 3/3208* | (2016.01) |
| *G09G 5/06* | (2006.01) |

(Continued)

(52) U.S. Cl.
CPC .......... *G06T 11/001* (2013.01); *G09G 3/2003* (2013.01); *G09G 3/3208* (2013.01); *G09G 5/02* (2013.01); *G09G 5/06* (2013.01); *H04N 1/60* (2013.01); *H04N 1/6005* (2013.01); *H04N 1/6008* (2013.01); *G09G 2320/0209* (2013.01); *G09G 2320/0242* (2013.01); *G09G 2320/0666* (2013.01); *G09G 2320/0693* (2013.01); *G09G 2340/06* (2013.01); *G09G 2360/145* (2013.01); *H04N 9/3182* (2013.01)

(58) Field of Classification Search
None
See application file for complete search history.

(56) References Cited

U.S. PATENT DOCUMENTS

| | | | |
|---|---|---|---|
| 5,426,596 | A | 6/1995 | Ogawa |
| 6,130,756 | A | 10/2000 | Grady et al. |

(Continued)

FOREIGN PATENT DOCUMENTS

| | | |
|---|---|---|
| CN | 100414598 C | 8/2008 |
| CN | 102332242 | 1/2012 |

(Continued)

OTHER PUBLICATIONS

International Search Report and Written Opinion from International Application No. PCT/US2016/049712, dated Nov. 7, 2016, 14 pp.

(Continued)

*Primary Examiner* — Nicholas R Wilson
(74) *Attorney, Agent, or Firm* — Shumaker & Sieffert, P.A.

(57) ABSTRACT

In an example, a method of gamut mapping may include generating a plurality of color values in a first color space based on a plurality of measured color values in a second color space using a color specification that maps color values corresponding to the second color space to color values corresponding to the first color space. The method may include generating a second-order or higher response-surface regression model that maps color values corresponding to the first color space to color values corresponding to the first color space.

30 Claims, 11 Drawing Sheets

(51) Int. Cl.
*H04N 1/60* (2006.01)
*H04N 9/31* (2006.01)

(56) References Cited

U.S. PATENT DOCUMENTS

| | | |
|---|---|---|
| 6,278,533 B1 | 8/2001 | Takemoto |
| 7,969,628 B2 | 6/2011 | Kim et al. |
| 9,406,024 B1 | 8/2016 | Gordon et al. |
| 9,626,775 B1 | 4/2017 | Safaee-Rad et al. |
| 9,659,388 B1 | 5/2017 | Safaee-Rad et al. |
| 2003/0125911 A1 | 7/2003 | Snyder et al. |
| 2005/0280881 A1 | 12/2005 | Stokes et al. |
| 2008/0309968 A1 | 12/2008 | Berestov et al. |
| 2010/0289835 A1 | 11/2010 | Holub |
| 2012/0056910 A1 | 3/2012 | Safaee-Rad et al. |
| 2012/0056911 A1 | 3/2012 | Safaee-Rad et al. |
| 2013/0050504 A1 | 2/2013 | Safaee-Rad et al. |
| 2013/0314447 A1 | 11/2013 | Wu et al. |
| 2014/0140616 A1 | 5/2014 | Choi et al. |
| 2015/0179135 A1 | 6/2015 | Stauder et al. |
| 2015/0310794 A1 | 10/2015 | Gille et al. |

FOREIGN PATENT DOCUMENTS

| | | |
|---|---|---|
| KR | 101303874 B1 | 9/2013 |
| WO | 2008001239 A2 | 1/2008 |

OTHER PUBLICATIONS

Lee, et al., "Balancing the white emission of OLED by a design of fluorescent blue and phosphorescent green/red emitting layer structures," Synthetic Metals 159, available online Nov. 14, 2008, 6 pp.
ITU-R Recommendation BT.2020-2, "Parameter values for UHDTV systems for production and international programme exchange," Oct. 2015, 8 pp.
U.S. Appl. No. 15/096,768, filed by Reza Safaee-Rad, filed Apr. 12, 2016.
U.S. Appl. No. 15/096,831, filed by Reza Safaee-Rad, filed Apr. 12, 2016.
Response to Written Opinion dated Nov. 7, 2016, from International Application No. PCT/US2016/049712, filed on Feb. 16, 2017, 20 pp.
International Search Report and Written Opinion from International Application No. PCT/US2016/049664 dated Nov. 7, 2016, 14 pages.
International Search Report and Written Opinion from International Application No. PCT/US2016/049684, dated Nov. 7, 2016, 12 pages.
Second Written Opinion from International Application No. PCT/US2016/049664 dated Sep. 19, 2017, 12 pages.
Second Written Opinion from International Application No. PCT/US2016/049684, dated Sep. 19, 2017, 10 pages.
Second Written Opinion from International Application No. PCT/US2016/049712, dated Oct. 19, 2017, 10 pages.

| 0 | 0.2627613411421 | -0.0075506950033 | -0.8007867344348 | 0.0045054814135 | 0.0046098010114 | 0.0046055948520 | -0.0025943891250 | -0.0020608087830 | -0.0005520878880 | -0.0000190406030 |
| 0 | -0.3990008680430 | 0.6171303759800 | -0.7887978852130 | 0.0046021170380 | 0.0047741410750 | 0.0047074115630 | -0.0013658735240 | -0.0033113789650 | -0.0006492937400 | -0.0000195282710 |
| 0 | -1.0154381432220 | -0.8761514740320 | 1.3190182970840 | 0.0042961134630 | 0.0044611417970 | 0.0043743536980 | -0.0000228545670 | -0.0003175339160 | -0.0044122379460 | -0.0000182684450 |

WHITE POINT CALIBRATION AND GAMUT MAPPING FOR A DISPLAY

This application claims the benefit of U.S. Provisional Patent Application No. 62/254,705 filed on Nov. 12, 2015, which is hereby incorporated by reference herein in its entirety.

TECHNICAL FIELD

This disclosure relates to displays, and more particularly, to calibration and adjustment techniques used for displays.

BACKGROUND

A wide variety of devices may include a display for visually presenting images and/or other information. Devices that include a display may include, for example, digital televisions, wireless communication devices, mobile telephones (e.g., cellular or satellite radio telephones), smartphones, personal digital assistants (PDAs), laptop or desktop computers, tablet computers, digital cameras, video cameras, digital media players, video game consoles, video gaming devices, etc.

To render colors correctly on a display, a display processor may perform color correction on an image to be displayed in order to generate a color-corrected image. The display processor may cause the display to display the color-corrected image. Performing color correction may involve adjusting the colors in an image based on a target white point for the display. For example, some color correction techniques may adjust the colors in an image based on a color correction matrix (which may also be referred to as a color correction model) that is determined based on the target white point for the display. As another example, performing color correction may involve adjusting the colors in an image based on mapping the gamut of a display, which may be referred to as gamut mapping.

SUMMARY

This disclosure describes techniques for calibrating and adjusting a display. For example, this disclosure describes techniques for calibrating and adjusting the white point of a display (e.g., an organic light-emitting diode (OLED) display), gamut mapping a display to a color space, and/or gamut mapping a display based on the performance of a different display. The techniques for calibrating and adjusting a display described herein may be modeled using a response-surface regression model that may include second order or higher color value terms. The model may be generated for both first color space-to-second color space and second color space-to-first color space (e.g., RGB-to-XYZ and XYZ-to-RGB). This model may form the basis for predicting color space values (e.g., RGB values) for the desired white point, for gamut mapping, and the like. There may be many solutions to the prediction models, allowing for optimizing panel factors, such as OLED panel luminance (e.g., brightness) and/or power consumption.

In one example, this disclosure describes a method comprising receiving, by one or more processors, a first plurality of color values, wherein the first plurality of color values correspond to a first color space; receiving, by the one or more processors, a plurality of measured color values corresponding to a plurality of colors displayed by a first target display, wherein the plurality of measured color values correspond to a second color space, and wherein the first plurality of color values are associated with the plurality of measured color values; generating, by the one or more processors, a second plurality of color values from the plurality of measured color values using a color specification that maps color values corresponding to the second color space to color values corresponding to the first color space, wherein the second plurality of color values correspond to the first color space; and generating, by the one or more processors based on the first plurality of color values and the second plurality of color values, a second-order or higher response-surface regression model that maps the first plurality of color values corresponding to the first color space to the second plurality of color values corresponding to the first color space.

In another example, this disclosure describes a device comprising a memory; and one or more processors configured to: receive a first plurality of color values, wherein the first plurality of color values correspond to a first color space; receive a plurality of measured color values corresponding to a plurality of colors displayed by a first target display, wherein the plurality of measured color values correspond to a second color space, and wherein the first plurality of color values are associated with the plurality of measured color values; generate a second plurality of color values from the plurality of measured color values using a color specification that maps color values corresponding to the second color space to color values corresponding to the first color space, wherein the second plurality of color values correspond to the first color space; store the second plurality of color values in the memory; and generate, based on the first plurality of color values and the second plurality of color values, a second-order or higher response-surface regression model that maps the first plurality of color values corresponding to the first color space to the second plurality of color values corresponding to the first color space.

In another example, this disclosure describes an apparatus comprising means for receiving a first plurality of color values, wherein the first plurality of color values correspond to a first color space; means for receiving a plurality of measured color values corresponding to a plurality of colors displayed by a first target display, wherein the plurality of measured color values correspond to a second color space, and wherein the first plurality of color values are associated with the plurality of measured color values; means for generating a second plurality of color values from the plurality of measured color values using a color specification that maps color values corresponding to the second color space to color values corresponding to the first color space, wherein the second plurality of color values correspond to the first color space; and means for generating, based on the first plurality of color values and the second plurality of color values, a second-order or higher response-surface regression model that maps the first plurality of color values corresponding to the first color space to the second plurality of color values corresponding to the first color space.

In another example, this disclosure describes a non-transitory computer-readable storage medium having instructions stored thereon that, when executed, cause one or more processors to receive a first plurality of color values, wherein the first plurality of color values correspond to a first color space; receive a plurality of measured color values corresponding to a plurality of colors displayed by a first target display, wherein the plurality of measured color values correspond to a second color space, and wherein the first plurality of color values are associated with the plurality of measured color values; generate a second plurality of color values from the plurality of measured color values using a color specification that maps color values corresponding to the second color space to color values corresponding to the first color space, wherein the second plurality of color values correspond to the first color space; and generate, based on the first plurality of color values and the second plurality of color values, a second-order or higher response-surface regression model that maps the first plurality of color values corresponding to the first color space to the second plurality of color values corresponding to the first color space.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is an exemplary matrix to perform RGB to XYZ modeling for an exemplary display device according to this disclosure.

DETAILED DESCRIPTION

Figure 1:
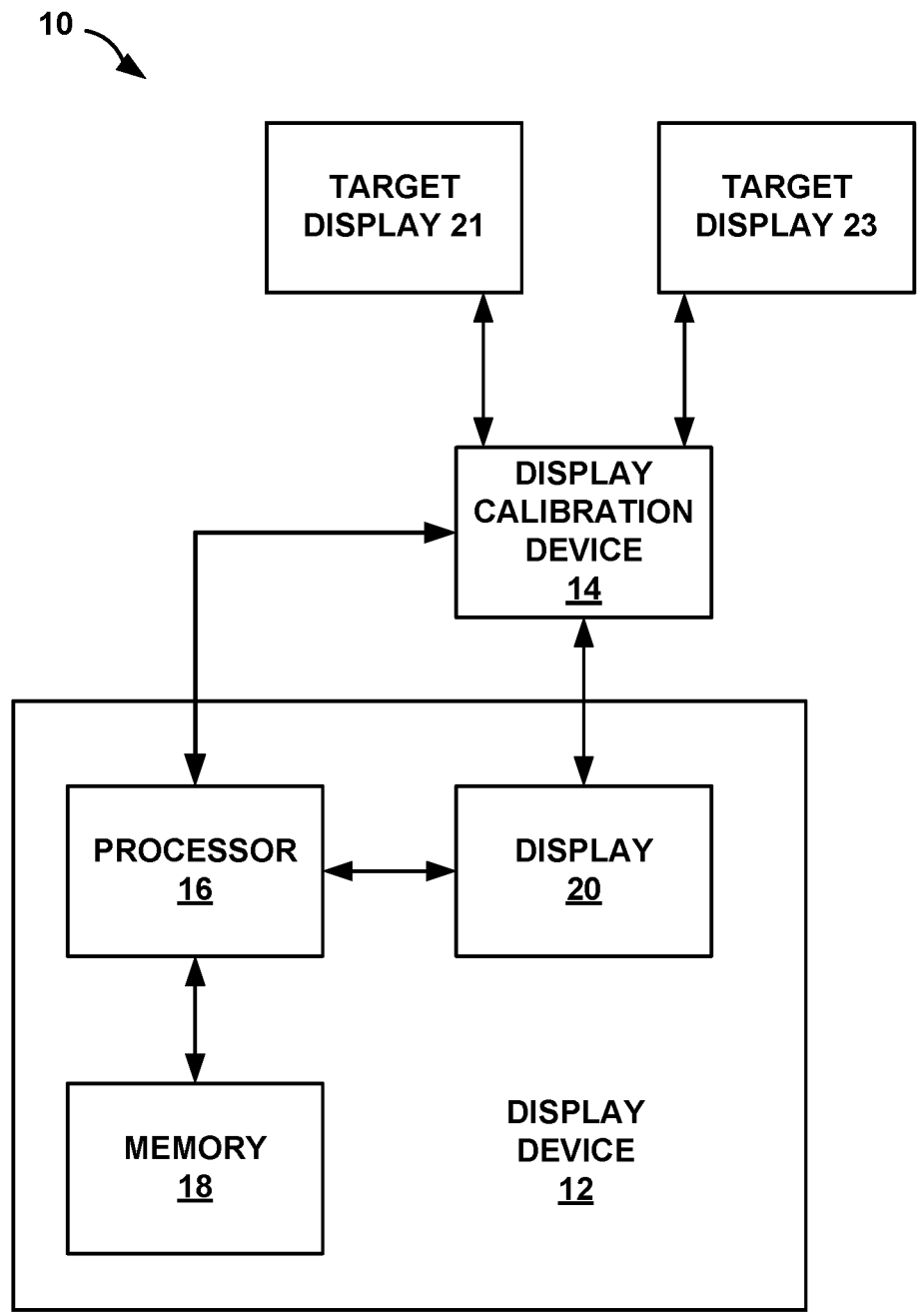
FIG. 1 is a block diagram illustrating an example display calibration system that may be used to implement the display calibration and adjustment techniques of this disclosure.

This disclosure describes techniques for calibrating and adjusting a display. For example, this disclosure describes techniques for calibrating and adjusting a display by enabling the adjustment (e.g., modification) of one or more color values of an image before the image is presented on the display. As another example, this disclosure describes techniques for calibrating and adjusting the white point of a display (e.g., an organic light-emitting diode (OLED) display). As another example, this disclosure describes techniques for calibrating and adjusting the white point of a display to match or otherwise be closer to a target white point. In such an example, the target white point may be defined by a specification, defined by a user, or by the measured performance of a display (e.g., measuring the white point of a display using, for example, a colorimeter). Different target white points for a display may exhibit different levels of luminance loss and/or tint. A display calibration device may allow a user or device manufacturer to select different white points to achieve different levels of luminance loss and/or tint, but changing the white point may change the perceived color of the white point.

The target white point for a display may refer to a displayed color that is defined to correspond to white in an image that is displayed by the display. In general, target white points that may be used for a display may vary from cooler whites (e.g., "bluish whites") to warmer whites (e.g., "yellowish whites"). Different target white points may result in different levels of color accuracy in an image reproduced by the display. The best white point to use for a display may be dependent upon the particular image to be displayed and/or upon the desires of the manufacturer and/or end user. The best white point to use may also be dependent on external factors such as illumination conditions.

As another example, this disclosure describes techniques for gamut mapping to a color space standard (e.g., the sRGB standard) for a display (e.g., an OLED display). In some examples, as used herein, the terms standard, color standard, specification, color specification, color space specification, and color space standard may refer to a color specification, such as sRGB, scRGB, Adobe RGB, Adobe Wide Gamut RGB, ProPhoto RGB, CIE XYZ, ITU-R Recommendation BT.2020 (commonly referred to as Rec. 2020 or BT.2020), or any other color specification (whether a formally adopted by a standard setting organization or not).

In some examples, as used herein, the term color space may refer to one or more color channels, where each channel may be represented by one or more values. In some examples, the one or more values may refer to chromaticity values, luminance values, color values, any other value used to define or otherwise represent a channel, or any combination thereof. For example, the RGB color space includes the Red channel, the Green channel, and the Blue channel. Therefore, a value corresponding to the RGB color space may correspond to the R, G, or B channel. Similarly, the CIE XYZ color space (or, more simply, the XYZ color space) includes the X channel, the Y channel, and the Z channel. Therefore, a value corresponding to the XYZ color space may correspond to the X, Y, or Z channel. As yet another example, the CIE xyY color space (or, more simply, the xyY color space) includes the x channel, the y channel, and the Y channel. Therefore, a value corresponding to the xyY color space may correspond to the x, y, or Y channel.

As another example, both the sRGB and scRGB color specifications define the RGB color space relative to a CIE 1931 xy chromaticity diagram. In the example of the RGB color space, the RGB color space includes three color channels: Red, Green, and Blue. Each of the R, G, and B channels may be represented by one or more values. For example, each of the R, G, and B channels may be represented by one or more chromaticity values (e.g., CIE xyY or CIE XYZ values). For example, each of the R, G, and B channels may be defined as a combination of x, y, and Y values, or as a combination of X, Y, and Z values. As another example, each of the R, G, and B channels may be represented by an N-bit value, where N is 1 or more bits. For example, each of the R, G, and B channels may be represented by an 8-bit value (e.g., a value ranging from 0-255), a 10-bit value (e.g., a value ranging from 0-1023), an 11-bit value (e.g., a value ranging from 0-2047), or a 12-bit value (e.g., a value ranging from 0-4095). Accordingly, in view of these examples, it is understood that the one or more color channels may refer to one or more primary color channels, or one or more channels even if not technically considered a color (e.g., the luminance channel Y in the CIE xyY color space). It is also similarly understood that each of the one or more values corresponding to each channel in a color space may be represented by an N-bit value, where N is 1 or more bits. For example, in a three or four channel color space, each channel may be represented by an 8-bit value (e.g., a value ranging from 0-255), a 10-bit value (e.g., a value ranging from 0-1023), an 11-bit value (e.g., a value ranging from 0-2047), or a 12-bit value (e.g., a value ranging from 0-4095).

As used herein, a color specification may map or otherwise relate a first color space to a second color space (and vice versa). For example, a color specification may map one or more values of a first color space to one or more values of a second color space (and vice versa). The use of "to" in the previous sentences of this paragraph does not imply that the mapping is one way. Rather, a color specification may map or otherwise relate two color spaces such that one or more values of a first color space may be converted to one or more values of a second color space, and/or one or more values of the second color space may be converted to one or more values of the first color space using the color specification. For example, the sRGB color specification maps the RGB color space to the CIE xyY (where x and y are chromaticity coordinate values and Y is a luminance value) color space or the CIE XYZ (where X, Y, and Z are tristimulus values) color space. For example, using the sRGB color specification, one could determine RGB values in the RGB color space corresponding to CIE xyY or CIE XYZ values respectively in the CIE xYZ or CIE XYZ color spaces. Similarly, using the sRGB color specification, one could determine CIE xyY or CIE XYZ values respectively in the CIE xYZ or CIE XYZ color spaces corresponding to RGB values in the RGB color space.

As another example, this disclosure describes techniques for gamut mapping a first display based on the performance of a second display, where the second display may or may not conform to a color specification. In such an example, the techniques described herein may enable making the first display present colors in the same manner as the second display, or, for example, enable making the first display present colors in a manner such that the presented colors look more like the gamut of the second display.

In general, the RGB color space is an additive color space in which red, green, and blue values (the three additive primary colors in this color space) may be added together in various ways to reproduce a broad range of colors. As indicated above, red, green, and blue may each be referred to as a channel (e.g., the red channel, green channel, and blue channel). The entire range of available colors may be referred to as the gamut (or color gamut). Zero intensity for each component gives the darkest color (e.g., no light or representing no light, which may be considered the black), and full intensity of each R, G, and B channel may correspond to a white. For example, in an 8-bit implementation each the value corresponding to each R, G, and B channel may range from 0-255. In this 8-bit example, (0, 0, 0) may correspond to a black and (255, 255, 255) may correspond to a white, (255, 0, 0) may correspond to a red, (0, 255, 0) may correspond to a green, and (0, 0, 255) may correspond to a blue. The quality of white (and other colors) depends on the nature of the primary light sources (e.g., the combination of R, G, and B values), but if they are properly balanced, the result is a white point matching the white point of the display on which the R, G, and B values are destined to be displayed on.

The RGB color space may be defined by a plurality of color specifications. Generally, each RGB color specification (e.g., sRGB, scRGB, Adobe RGB, Adobe Wide Gamut RGB, ProPhoto RGB, and Rec. 2020) has a different gamut due to how the chromaticities of the red, green, and blue primaries are defined along with the white point. For example, the sRGB color specification specifies the chromaticities of the red, green, and blue primaries (and therefore the gamut), white point, and gamma for a display in a particular way different from how the scRGB color space specifies the chromaticities of the red, green, and blue primaries (and therefore the gamut), white point, and gamma. While various examples described herein may refer to the sRGB color specification, it is understood that such examples (and other non-sRGB color specification examples) may apply to any other color specification. Similarly, while various examples described herein may refer to the RGB color space, it is understood that such examples (and other non-RGB color space examples) may apply to any other color space.

A color specification may define a white point in a particular color space. For example, a color specification may define a white point according to a combination of red, green, and blue chromaticities. In some examples, this disclosure describes techniques for calibrating and adjusting the white point of a display. For example, while a display may be configured to conform to a color specification (e.g., sRGB), the display may be calibrated and adjusted to have a custom white point, meaning a white point that is different from the white defined by the color specification (e.g., sRGB). In other examples, this disclosure describes techniques for gamut mapping a display to a color specification (e.g., sRGB). For example, this disclosure describes techniques for mapping the gamut of a display to the gamut of a color specification. As another example, this disclosure describes techniques for configuring a display such that the gamut of the display maps as closely as possible to the gamut of a color specification. As another example, this disclosure describes techniques for generating a second-order (or higher) response-surface regression model based on measured performance of a display, which may be used for gamut mapping an input corresponding to a first color specification (e.g., an sRGB input) such that the input is adjusted to, as a few examples, (1) conform to a second color specification, (2) conform to (or closer to) a specified white point when actually displayed by the display, (3), conform closer to the first color specification when actually displayed by the display. As another example, this disclosure describes techniques for generating a second-order (or higher) response-surface regression model based on measured performance of a second display and a target display which may be used for gamut mapping a first display, where the second display may or may not conform to color specification. For example, the second display may not conform to a color standard (e.g., an adopted color specification), but may conform to a private color specification (e.g., a color specification not adopted). As used herein, reference to gamut mapping any display may refer to adjusting one or more values of one or more color channels corresponding to display data (e.g., an image).

As used herein, XYZ may stand for the International Commission on Illumination (CIE) 1931 Tristimulus values. These values may be measured "absolutely", although often they may be used in a more relative sense, where they have been normalized such that Y=1 or Y=100. The x and y color coordinates may be calculated from them in the following manner: x=X/(X+Y+Z) and y=Y/(X+Y+Z). CIE XYZ is one example of a color space that encompasses all color sensations that an average person can experience. CIE XYZ (tristimulus values) is a device invariant color representation. CIE XYZ may serve as a standard reference against which many other color spaces are defined. For example, CIE XYZ may serve as a standard reference against which many other color spaces are defined in a color specification (e.g., sRGB or any other color specification). Any color on the CIE chromaticity diagram can be considered to be a mixture of the three CIE primaries: X, Y, and Z. The mixture of the three CIE primaries may be specified by three numbers X, Y, Z called tristimulus values. The CIE primaries are not real colors, but convenient mathematical constructs.

OLED panels (e.g., also referred to as OLED displays), even after tuning by the manufacturer, may differ greatly from standard LCD panel models, particularly in having substantial channel-to-channel crosstalk, a much wider gamut, and usually a bluer white point. At times, a manufacturer, end-user, or any user may like to calibrate a display's white point to something other than the native one, although unconcerned about standard tone scale or gamut. Similarly, the manufacturer, end-user, or any user would like to calibrate a display's gamut so that an input corresponding to a particular color space (e.g., an RGB color space input corresponding to the sRGB color specification) displayed on a display with substantial channel-to-channel crosstalk is perceived as closely as possible to the gamut of the sRGB color specification despite the substantial channel-to-channel crosstalk. Additionally, the manufacturer, end-user, or any user may like to calibrate a display's gamut so that an input corresponding to a particular color space (e.g., an RGB color space input corresponding to the sRGB color specification) displayed on a display with substantial channel-to-channel crosstalk is perceived as closely as possible to the gamut of a second display. For example, the second display may be a display that has a color output that is desirable to reproduce. Sometimes such a display is referred to as a "golden panel" or "golden display." As used herein, the terms display and panel may be interchangeable.

For an additive LCD display without substantial crosstalk, three measurements of the primary colors would be sufficient to calculate scaling factors to accomplish a white point calibration. For an OLED panel, this may not be the case. While certain examples herein are described as implementing one or more techniques described herein with respect to a display having substantial channel-to-channel crosstalk, it is understood that one or more techniques of this disclosure may be used with any display. For example, even an LCD panel may include channel-to-channel crosstalk between channels, albeit less than an OLED display. Accordingly, one or more techniques described herein may be implemented with an LCD panel. It is also understood that one or more techniques described herein may be used with any display, whether or not the display includes any crosstalk between channels. In accordance with the techniques of this disclosure, measurements made on a display (e.g., an OLED panel) tuned by the manufacturer, end-user, or any user may be used to generate a model of the display. From this model, combined with the desired white-point specification, the linear RGB values (e.g., RGB values that are not compressed) for the desired white can be predicted. These RGB values may dictate the linear scaling factors that can be used to calibrate the white point for the display. Because the requirements for the mapping may be multi-dimensional (new white point, maximum luminance, minimum power, etc.), trade-offs in performance may be necessary. Trade-offs can be controlled through choice of measurements made and used.

Certain displays, such as OLED panels, may demonstrate considerable channel-to-channel (e.g. red-green-blue (RGB) channels) crosstalk due to pixel-load dependency. That is, different intensities of output by one color channel may affect the output of the other color channels, often in a non-linear fashion. In the absence of crosstalk (and other departures from additivity), panels may be modeled using an invertible 3×3 RGB-to-XYZ matrix based on the primaries and native white point. Changing from the native white point (e.g., calibrating the white point) may be achieved by applying a 3×3 matrix, derived from measuring the RGB primaries, to the RGB values. These RGB values may be "linear" values that are not gamma-compressed. For OLED panels with crosstalk, this method of calibration may be ineffective.

In accordance with the techniques of this disclosure, a display (e.g., an OLED display) may be modeled using a response-surface regression model that may include second order or higher color value terms (e.g., R, G, and B) in a color space corresponding to a color specification (e.g., sRGB). A second-order term refers to a term having at least two color components (e.g., R*G, G*B, or B*R) or the square of a single color component (e.g., R*R, B*B, or G*G). A third-order term refers to a term having at least three color components, whether the same or different, such as R*G*B, R*R*B, B*B*G, R*R*R, and the like. The second order or higher response-surface regression model may better model the cross-talk between RGB channels in a display, such as an OLED display or a wide gamut LCD panel. For example, the second order or higher response-surface regression model may be used for calibrating and adjusting the white point of a display according to one or more techniques described herein, and gamut mapping according to one or more techniques described herein.

In some examples, the response-surface regression model (or any model described herein) may or may not be invertible. If not invertible, the model may be generated for both first color space-to-second color space and second color space-to-first color space. For example, the model may be generated for both RGB-to-XYZ and XYZ-to-RGB. In this example, the RGB-to-XYZ model maps color values corresponding to the RGB color space to color values corresponding to the XYZ color space, and the XYZ-to-RGB model (to the extent that the RGB-to-XYZ model is not invertible) maps color values corresponding to the XYZ color space to color values corresponding to the RGB color space. As described above, it is understood that the term color values with respect to the XYZ color space and other similar color spaces may not actually refer to color values, but instead more simply values corresponding to each of the channels. In this regard, it is understood that the terms "color values" and "channel values" may be used interchangeably. For example, use of "color values" necessarily includes reference to color values and/or channel values. Similarly, use of "channel values" necessarily includes reference to color values and/or channel values.

In some examples, the model(s) may form the basis for predicting color values in a desired color space (e.g., RGB values in the RGB color space). In some examples, the model(s) may form the basis for predicting color values in a desired color space corresponding to a color specification (e.g., RGB values corresponding to the sRGB color specification. For example, the model(s) may form the basis for predicting color values in a desired color space (e.g., RGB values in the RGB color space) for a desired white point. In some examples, the techniques of this disclosure provide for different solutions to the prediction equations, allowing for optimizing important display factors such as display luminance (e.g., brightness) and/or display power consumption. Theoretically, the brightest color on a display is white, which is an additive value of R+G+B in the RGB color space. In OLED displays, however, yellow (e.g., R+G) may be brighter (i.e., possessing a greater luminance). This may be used in calibration to optimize luminance while obtaining a specified white point. For example, one or more techniques of this disclosure include gamut mapping an OLED display (or any display) to have a bluer white point (e.g., a white point approaching blue, closer to blue, or actually blue) than would otherwise exist absent implementing the gamut mapping. For example, using one or more techniques described herein, an OLED display may be gamut mapped so that the OLED display exhibits a blue white point (or a bluer white point) during operation instead of a yellow white point (or a yellower white point).

Additionally, the choice of measurements (e.g., number of measurements) that are made may be selected to optimize the model while also limiting/optimizing the number of measurements needed. More precision prediction of white point may be desired and thus a greater number of measurements may be taken. However, greater precision may utilize a growth (e.g., an accelerating growth, such as an exponential growth) in the number of measurements required. Because of this, the number of measurements may be minimized for speed and simplicity of calibration.

In some examples, the techniques for calibrating and adjusting the white point of a display may, for each of one or more of the candidate white points, provide (e.g., via a user interface) information indicative of expected luminance loss characteristics associated with the respective candidate white point and/or information indicative of tint characteristics associated with the respective candidate white point. Providing information indicative of luminance loss characteristics and/or tint characteristics associated with candidate white points may allow a user to evaluate the trade-offs between different luminance loss characteristics and/or tint characteristics associated with different white points.

FIG. 1 is a block diagram illustrating an example display calibration system 10 that may be used to implement the display calibration and adjustment techniques of this disclosure. Display calibration system 10 may include a display device 12, a display calibration device 14, and one or more target displays (e.g., target display 21 and target display 23). As used herein, display calibration device 14 may be referred to as a calibration device, a calibration tool, a display calibration tool, a tool, a device, and the like.

Display device 12 may be any device (e.g., computing device) that includes a display. For example, display device 12 may be a wireless communication device, a wireless handset (such as, e.g., a mobile phone, examples of which include a cellular or satellite radio telephone, or a smartphone), a personal digital assistant (PDA), a laptop or desktop computer, a digital television, a tablet computer, a digital camera, a video camera, a digital media player, a video game console, a video gaming device, a video conferencing unit, etc. Display device 12 includes a processor 16, a memory 18, and a display 20.

Processor 16 may be configured to process images that are stored in memory 18 or received from another processor, and cause display 20 to display the processed images. Processor 16 may include one or more processors. In some examples, processor 16 may be a display processor, such as, e.g., a Mobile Display Processor (MDP). In further examples, processor 16 may be a central processing unit (CPU), a graphics processing unit (GPU), an image processor, a digital signal processor (DSP), a general purpose microprocessor, an application specific integrated circuit (ASIC), a field programmable logic array (FPGA), a combination of any of the foregoing devices, or other integrated or discrete logic circuitry. Processor 16 may be communicatively coupled to one or both of memory 18 and display 20. While FIG. 1 depicts processor 16, it is understood that display device 12 may include a CPU, GPU, and/or a display processing unit. Processor 16 conceptually depicts any processor or combination of processors.

Memory 18 may store image data to be displayed on display 20. Memory 18 may, in some examples, store processed image data that has been processed by processor 16. Memory 18 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium. Memory 18 may, in some examples, be a non-transitory computer-readable storage medium.

Display 20 may display one or more images (e.g., display data output by a processor of display device 12, such as processor 16). Display 20 may be any type of display including, for example, an OLED display, a liquid crystal display (LCD), a plasma display, or another type of display. The calibration techniques of this disclosure may be used with an OLED display or any other display that does or does not demonstrate a non-linear response due to channel crosstalk or due to other reasons. Display 20 may include a plurality of pixels that display 20 illuminates to display the one or more images. Each pixel may include one or more color channels. For example, each pixel may include RGB color channels, meaning that each pixel in this example illuminates according to RGB values corresponding to each color channel.

Target display 21 may or may not be associated with a corresponding device. Similarly, target display 23 may or may not be associated with a corresponding device. Target displays 21 and 23 may display one or more images (e.g., display data output by a processor of display device 12 such as processor 16, or display data output by display calibration device 14. In some examples, as used herein, the term "target display" may refer to a display being the same as display 20, but physically different from display 20 (meaning that the target display and display 20 are not a single display; rather, the target display is one display that may be of the same model or make as display 20, which is another physical display). For example, the target display may have at least one of a part number, model number, batch number, or identification number in common with the display 20. In some examples, the term "target display" may refer to the same physical display as display 20. Accordingly, target display 21 may refer to a display being the same as display 20 (at least with respect to at least one of a part number, model number, batch number, or identification number), but physically different from display 20. For example, target display 21 may have at least one of a part number, model number, batch number, or identification number in common with the display 20.

In other examples, as used herein, the term "target display" may refer to a physically different display from display 20 and that is not of the same model or make of display 20. For example, the target display may not have any part number, model number, batch number, or identification number in common with the display 20. Accordingly, target display 23 may refer to a display that is different from display 20. For example, target display 23 may be designed, manufactured, offered for sale, and/or sold by a first company, and display 20 may be designed, manufactured, offered for sale, and/or sold by a second company. For example, target display 23 may not have any part number, model number, batch number, or identification number in common with the display 20. In some examples, a target display with such attributes (i.e., a display not having any part number, model number, batch number, or identification number in common with the display 20) may be described or otherwise referred to herein as a "golden panel" or "golden display." For example, target display 23 may be referred to as golden display 23.

Target display 21 and/or target display 23 may be any type of display including, for example, an OLED display, a liquid crystal display (LCD), a plasma display, or another type of display. The calibration techniques of this disclosure may be used with an OLED display or any other display that does or does not demonstrate a non-linear response due to channel crosstalk or due to other reasons. Target display 21 and/or target display 23 may include a plurality of pixels that display 20 illuminates to display the one or more images.

In some examples, display calibration device 14 may be configured to calibrate and/or adjust display 20 of display device 12. For example, display calibration device 14 may be configured to calibrate and/or adjust a white point of display 20 of display device 12 according to one or more of the display calibration and adjustment techniques described in this disclosure. For example, display calibration device 14 may be configured to calibrate and/or adjust display 20 of display device 12 by enabling display 20 and/or display device 12 to adjust display data destined for display by display 20 to achieve a different white point (e.g., a specified white point) than would otherwise be displayed absent calibration and/or adjustment according to one or more of the display calibration and adjustment techniques described in this disclosure. Display calibration device 14 may include one or more processors that are configured to perform all or part of one or more of the display calibration and adjustment techniques described in this disclosure. In some examples, one or more techniques described in this disclosure may be implemented using one or more display calibration devices 14.

In other examples, display calibration device 14 may be configured to calibrate and/or adjust display 20 of display device 12. For example, display calibration device 14 may be configured to calibrate and/or adjust the gamut (e.g., the perceived gamut) of display 20 of display device 12 according to one or more of the display calibration and adjustment techniques described in this disclosure. For example, display calibration device 14 may be configured to calibrate and/or adjust the gamut (e.g., the perceived gamut) of display 20 of display device 12 based on measured performance of a target display (e.g., target display 21) according to one or more of the display calibration and adjustment techniques described in this disclosure. For example, display calibration device 14 may be configured to calibrate and/or adjust display 20 of display device 12 by enabling display 20 and/or display device 12 to adjust display data destined for display by display 20 to achieve a different and/or adjusted gamut than would otherwise be displayed absent calibration and/or adjustment according to one or more of the display calibration and adjustment techniques described in this disclosure. The different or adjusted gamut may correspond to a gamut that is specified by a color specification (e.g., sRGB). As another example, display calibration device 14 may be configured to calibrate and/or adjust display 20 of display device 12 by enabling display 20 and/or display device 12 to adjust display data destined for display by display 20 to match, approach, or more closely resemble the gamut of a specified color specification than would otherwise be displayed absent calibration and/or adjustment according to one or more of the display calibration and adjustment techniques described in this disclosure. Display calibration device 14 may include one or more processors that are configured to perform all or part of one or more of the techniques described in this disclosure relating to such examples.

In other examples, display calibration device 14 may be configured to calibrate and/or adjust display 20 of display device 12. For example, display calibration device 14 may be configured to calibrate and/or adjust the gamut (e.g., the perceived gamut) of display 20 of display device 12 based on measured performance of one or more target displays (e.g., target display 21 and/or target display 23) according to one or more of the display calibration and adjustment techniques described in this disclosure. For example, display calibration device 14 may be configured to calibrate and/or adjust display 20 of display device 12 by enabling display 20 and/or display device 12 to adjust display data destined for display by display 20 to achieve a different and/or adjusted gamut than would otherwise be displayed absent calibration and/or adjustment according to one or more of the display calibration and adjustment techniques described in this disclosure. As one example, the different or adjusted gamut may correspond to the gamut of at least one target display (e.g., target display 23). As another example, the different or adjusted gamut may be based on measured performance of one or more target displays (e.g., target display 21 and/or target display 23). As another example, display calibration device 14 may be configured to calibrate and/or adjust display 20 of display device 12 by enabling display 20 and/or display device 12 to adjust display data destined for display by display 20 to match, approach, or more closely resemble the gamut of a target display (e.g., target display 23) than would otherwise be displayed absent calibration and/or adjustment according to one or more of the display calibration and adjustment techniques described in this disclosure. Display calibration device 14 may include one or more processors that are configured to perform all or part of one or more of the techniques described in this disclosure relating to such examples.

In some examples, display calibration device 14 may include one or more user interfaces that are configured to interact with a user. For example, display calibration device 14 may include a display that is configured to display information related to the calibration and adjustment of display 20, e.g., in a textual and/or graphical form. The graphical form, such as a slider described herein, may be particularly useful to allow for user-friendly adjustments in the calibration process. As another example, display calibration device 14 may utilize display 20 as a user interface to display information related to the calibration and adjustment of display 20.

As a further example, the user interfaces of display calibration device 14 may include one or more user input devices that allow a user to provide input to display calibration device 14. Example user input devices include a keyboard, a mouse, a trackball, a microphone, a touch pad, a touch-sensitive or presence-sensitive display, or another input device. In examples where a touch-sensitive or presence-sensitive display is used as a user input device, the display may be integrated with the display of display calibration device 14 that is used to display information related to the calibration and adjustment of display 20.

Figure 2:
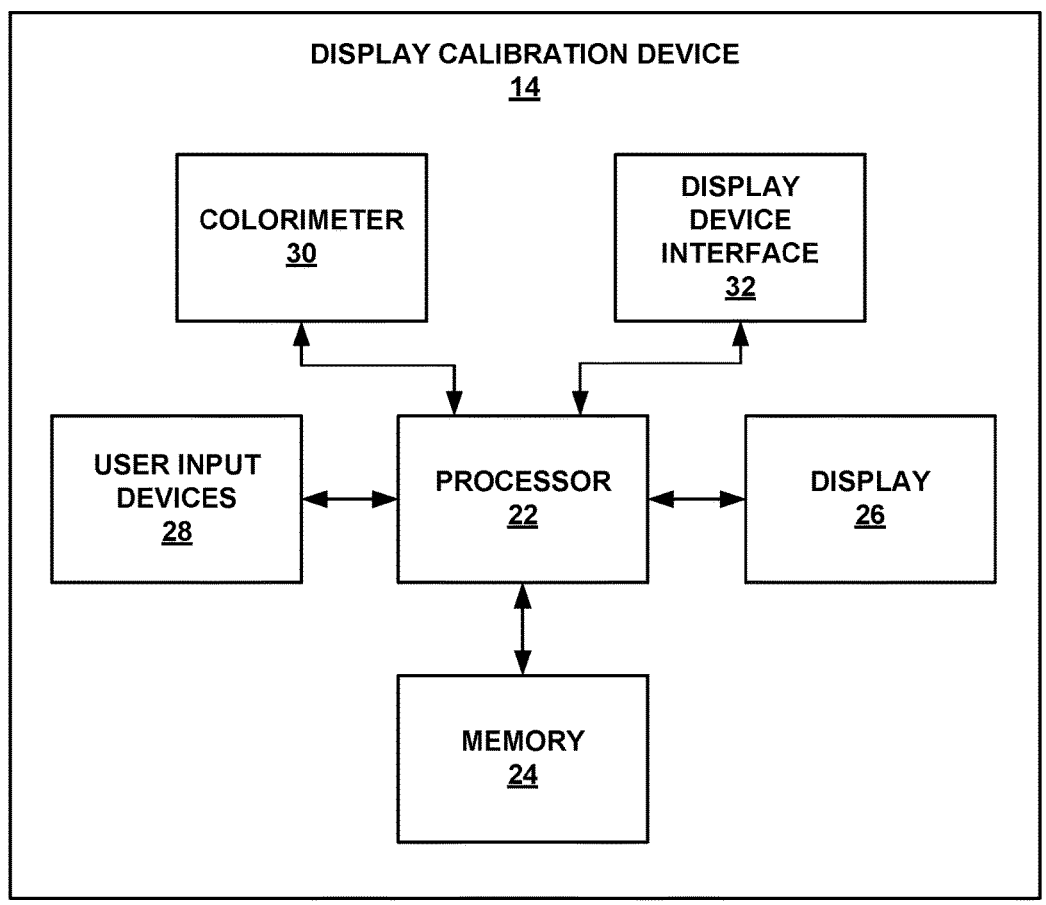
FIG. 2 is a block diagram illustrating an example display calibration device that may be used in the example display calibration system of FIG. 1.

FIG. 2 is a block diagram illustrating an example display calibration device 14 that may be used in the example display calibration system 10 of FIG. 1. Display calibration device 14 includes a processor 22, a memory 24, a display 26, one or more user input devices 28, a colorimeter 30, and a display device interface 32. In other examples, colorimeter 30 may be separate and distinct from calibration device 14. For example, calibration device 14 may not include colorimeter 30. As another example, a device other than calibration device 14 may include or otherwise be colorimeter 30.

Processor 22 may be configured to perform one or more display calibration and/or adjustment algorithms, and to calibrate a display via display device interface 32 based on the results of the display calibration and/or adjustment algorithms. In some examples, processor 22 may be a central processing unit (CPU), a general purpose microprocessor, an application specific integrated circuit (ASIC), a field programmable logic array (FPGA), a combination of any of the foregoing devices, or other integrated or discrete logic circuitry. Processor 22 may be communicatively coupled to one or more of memory 24, display 26, user input devices 28, colorimeter 30 and display device interface 32.

Memory 24 may store program code to implement one or more display calibration and/or adjustment algorithms. Memory 24 may also store calibration data associated with the display calibration and/or adjustment algorithms. Memory 24 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium. Memory 24 may, in some examples, be a non-transitory computer-readable storage medium.

Display 26 may display one or more images (e.g., processed images that are processed by processor 22). Display 26 may be any type of display including, for example, a liquid crystal display (LCD), an organic light-emitting diode display (OLED), a cathode ray tube (CRT) display, a plasma display, or another type of display device.

User input devices 28 may include one or more user input devices that allow a user to provide input to display calibration device 14. Example user input devices include a keyboard, a mouse, a trackball, a microphone, a touch pad, a touch-sensitive or presence-sensitive display, or another input device. In examples where a touch-sensitive or presence-sensitive display is used as one of user input devices 28, the user input device may be integrated with display 26 to display information related to the calibration and adjustment of another display (e.g., display device 12).

In further examples, processor 22 may display information related to the calibration and adjustment of another display (e.g., display device 12) on the display itself (e.g., display 20 of display device 12). In such examples, processor 22 may use display device interface 32 to communicate with display device 12 to display the calibration information.

Colorimeter 30 may perform native white point measurements on a display (e.g., display 20 of display device 12). Processor 22 may use the native white point measurements to determine one or both of luminance loss and tint associated with candidate white points. Colorimeter 30 may, for example be any of a colorimeter, photometer, spectrophotometer, or other device configured to measure the light emitted by the display. In some examples, colorimeter 30 may be separate from display calibration device 14. In such an example, the output of colorimeter 30 may be made available to display calibration device 14 in order to perform the techniques of this disclosure.

Display device interface 32 may provide a communication interface between display calibration device 14 and display device 12. Display device interface 32 may be any type of wired or wireless interface, and the communication protocol may be any type of communication protocol.

Figure 3:
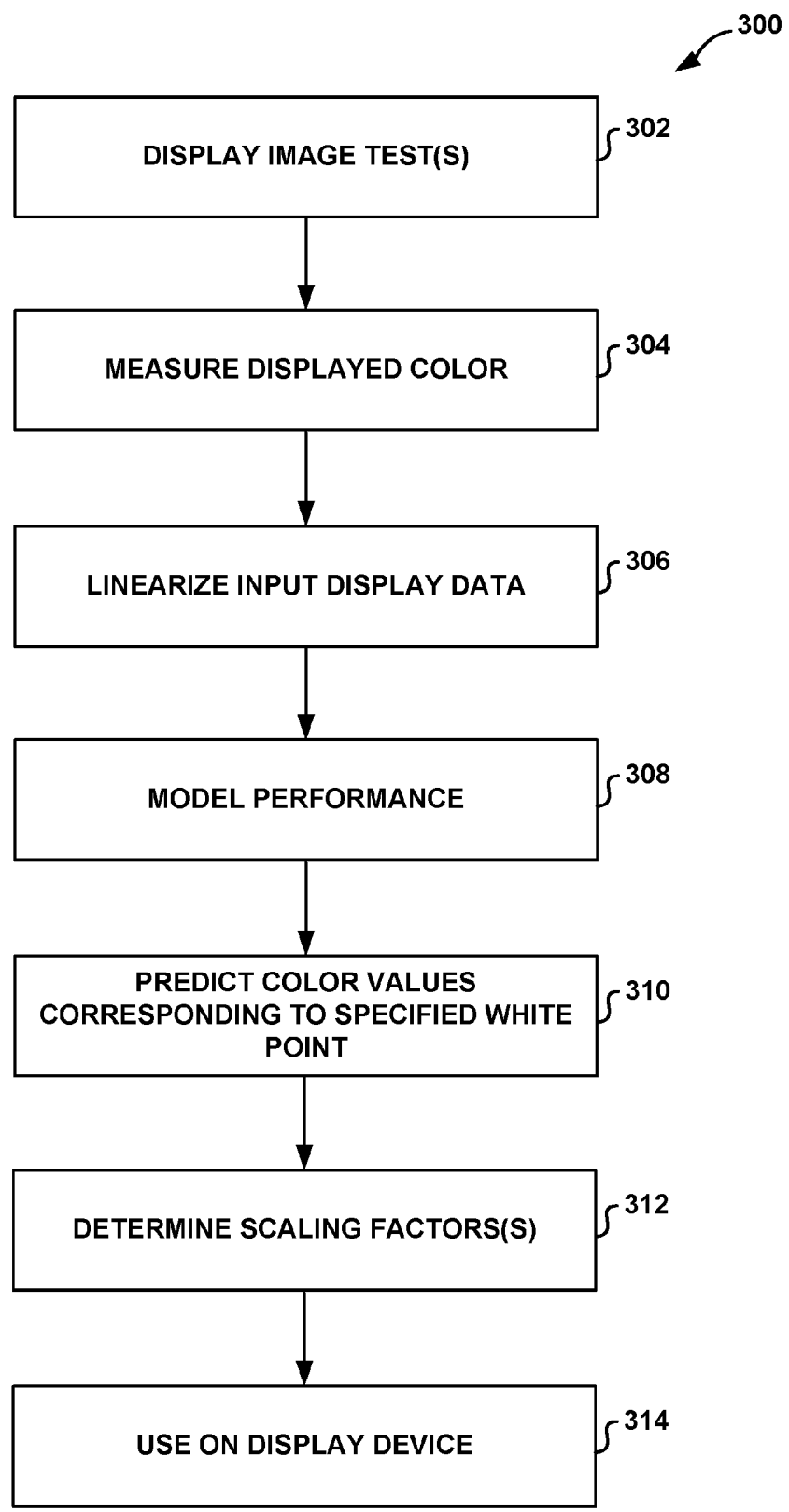
FIG. 3 is a flow diagram illustrating an example display calibration and adjustment technique according to this disclosure.

FIG. 3 illustrates an example display calibration and adjustment technique according to this disclosure. Method 300 may be performed by display calibration device 14 to perform display calibration on display device 12. In one example, display device 12 may include display 20. One or more image tests may be sent from the calibration device 14 to a target display (302). In some examples, the target display may include target display 21. The one or more image tests may include a display of a single color per test or, alternatively, include a more complex multi-colored test pattern. The colors tested may be samples that are close to and/or actually constitute a specified white point. In response to receiving the test patterns, the target display (e.g., target display 21) may display the one or more image tests received from display calibration device 14. It is understood that while FIG. 3 may be described below with respect to particular color space and color specification examples, the example of FIG. 3 may be abstracted to apply to any color space(s) and/or color specification(s).

Display calibration device 14 may measure the displayed one or more image tests displayed by the target device (e.g., target display 21) (304), which may result in one or more measured values. For example, the one or more measured values may be XYZ values. In one example, the measurement is taken from the center of the target display (e.g., target display 21). In one example, the number of measurements is greater than or equal to 27. In one example, the number of measurements is a perfect cube (e.g., 8, 27, and 64). The testing of the color displayed by the target display (e.g., target display 21) may utilize colorimeter 30 of display calibration device 14. Display calibration device 14 may determine the equivalent XYZ color values corresponding to the color values displayed by display device 12.

Display calibration device 14 may linearize the input display data (e.g., the one or more image tests) to correct (e.g. remove) gamma compression for each of the one or more image tests (306). In some examples, gamma compressed data includes luminance or tristimulus values that are encoded according to a non-linear operation. In such examples, gamma compressed data (e.g., a gamma compressed image) may be considered non-linear. For example, an image, such as one or more image tests, may be defined by R'G'B' values (e.g., gamma compressed RGB values), and may be decoded to remove the non-linearity. In the R'G'B' example, R'G'B' values may be decoded resulting in linear RGB values. The linear RGB values in this example may be referred to as actual RGB values since they correspond to display data derived from the image(s) (e.g., one or more image tests) destined for display by the target display (e.g., target display 21).

Display calibration device 14 may model a mapping (e.g., a relationship) between one or more color values corresponding to the input of display data (e.g., one or more color values of one or more color tests corresponding to a first color space (e.g., RGB) and one or more measured color values corresponding to a second color space (e.g., XYZ) (308). For example, display calibration device 14 may be configured to use the one or more linearized color values corresponding to the one or more image tests. This model may constitute a polynomial color correction analytical model response-surface regression, and may include a plurality of coefficients for one or more second order or higher terms. This model may be referred to as a polynomial color correction (PCC) model. It is understood that the term PCC may be loosely used throughout this disclosure to refer to a color correction model (e.g., where the input and the output are in the same color space) or a color model (e.g., where the input and the output are in different color spaces). For example, the PCC model may include coefficients for each of red, green, and blue channels via the creation of a matrix. The matrix may include, for example, a 3×8 or 3×11 matrix. The matrix values may correspond to coefficients in the PCC model. The PCC model may be used to convert values of a first color space (e.g., RGB color values) to values of a second color space (e.g., XYZ color values). Similarly, the PCC model may additionally or alternatively be used to convert values of the second color space (e.g., XYZ color values) to values of the first color space (e.g., RGB color values).

The PCC model may include terms of multi-order (e.g., second or third order). Variables (e.g., terms) other than white point alone may be factored into this model. For example, the minimization of luminance (e.g. brightness) loss or power efficiency compared to the native white point of the display can be factored into the model. For example, if the model is used to minimize power consumption, the display of bluer light may require more power use and so blue loss may be relaxed (e.g., allowed to waiver 5% from a more exact white point calibration) in the model compared to a white point calibrated to a particular level. In another example, if the model is used to maximize luminance, but one color channel displays brighter than another, reducing that brighter color may be relaxed by the model in order to allow for a white point with more luminance.

Display calibration device 14 may predict color values corresponding to the first color space for a specified white point on display device 12 using the model (310). For example, display calibration device 14 may predict RGB values for a specified white point on display device 12 using the model. As another example, using the model, a desired white point specified by values of the second color space (e.g., XYZ values) may be input into the model to generate predicted RGB values based on the model. For example, a specified white point may be specified by (Xs, Ys, and Zs), wherein Xs, Ys, and Zs respectively stand for the specified X value, the specified Y value, and the specified Z value. These predicted RGB values may be linear (e.g., not gamma compressed values). Display calibration device 14 may determine one or more scaling factors using the predicted RGB values for use on display device 12 (312). For example, display calibration device 14 may be configured to store the one or more scaling factors on a memory (e.g., memory 18) of display device 12.

In some examples, the scaling factors may be a ratio between a white point (e.g., one white point in the 8-bit RGB color space includes (255, 255, 255)) and predicted color values. The white point may be described with respect to a color space and/or a display. For example, the scaling factors may be described as being a ratio between a white point of a color space and/or display and predicted colors values. In an example where the color space is RGB, the ratio may be defined as (predicted RGB/a white point (e.g., (255, 255, 255) in an 8-bit RGB color space example)). For example, an RGB compressed input image may include an area of pixels having 8-bit RGB values of (250, 180, 255) after having been decoded. This area of pixels having RGB values of (250, 180, 255), which may correspond to a test pattern, may be displayed by a display (e.g., display 20 or a target display). Display calibration device 14 may measure the display when displaying this area of pixels resulting in measured values for this area of pixels. As described above, the measured values may correspond to measured XYZ values. In this example, after modeling the relationship between the input (e.g., the color values displayed) and the output (e.g., the measured values), calibration device 14 may predict the RGB values for a calibrated white point on display device 12 using the model by inputting desired XYZ values into the model. Display calibration device 14 may be configured to output predicted RGB values (e.g., RGB values that correspond to the XYZ values input into the model). In this example, the predicted RGB values may be (253, 180, 255). In this example, display calibration device 14 may convert the predicted RGB values into scaling factors by taking, for each channel, the predicted channel value and dividing it by the actual RGB value. In this example, the scaling factor for the red channel would be (253/255), the scaling factor for the green channel would be (180/255), and the scaling factor for the blue channel would be (255/255). In some examples, the scaling factor for any channel may be equal to or less than one.

Display calibration device 14 may set the white point of display device 12 based on the predicted RGB values (314). For example, display calibration device 14 may set the white point of display device 12 based on the scaling factors derived from the predicted RGB values. The white point of display device 12 may be set by loading the scaling factors onto the display device 12. For example, display calibration device 14 may store the scaling factors in memory 18. The scaling factors may comprise a matrix of values corresponding to the polynomial color correction (PCC) model. In such an example, the matrix may be N×N, where N is the number of channels in the color space. For example, in the RGB color space, the matrix may be a 3×3 matrix with the principle diagonal including the scaling factors with the first row being defined as (red channel scaling factor, 0, 0), the second row being defined as (0, green channel scaling factor, 0), and the third row being defined as (0, 0, blue scaling factor).

In other examples, a matrix may not be used. In such examples, whether a matrix is used or not, display device 12 may be configured to multiply any color value (e.g., R, G, or B values) by the scaling factor corresponding to the requisite channel. For example, red values are multiplied by the red scaling factor. In examples where the input for display includes compressed RGB values, display device 12 may first remove the compression to generate linear RGB values, and then multiply the linear RGB values by the corresponding scaling factor. The scaled RGB values are then output to display 20 of display device 12.

By adjusting the linear RGB values corresponding to the input in this manner, a desired white point or gamut may be displayed by display 20. A particular white point (or gamut in other examples) may be determined by a user. The input of the user may be an x, y pair or as a standard white point (e.g., D50 or D65). In some examples, a different PCC model may be used to model each different white point. For example, a first white point and a second white point that are different from one another may respectively have a first PCC model and a second PCC model corresponding to the white point. In other examples, there may be multiple PCC models for each particular white point, such as a power consumption PCC for D65, an accuracy PCC for D65, a lowest amount of luminance lost PCC for D65, and the like. Once input, the PCC may be determined from the white point and then the PCC model is applied to the input of the user. A matrix may be determined once the user has specified the white point.

Figure 4A:
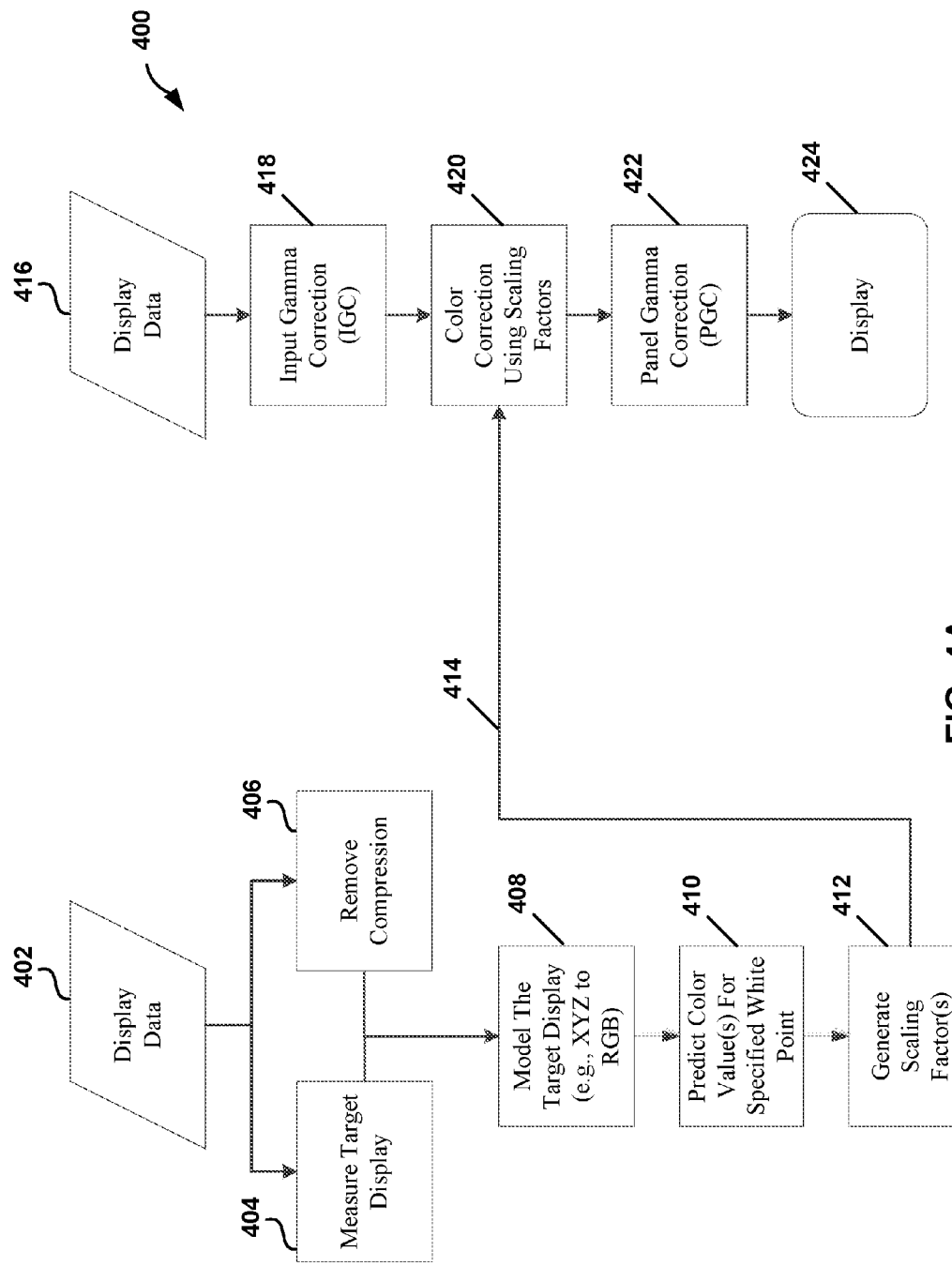
FIG. 4A is a flow diagram illustrating an example display calibration and adjustment technique for white point calibration according to this disclosure.

FIG. 4A illustrates an example display calibration and adjustment technique according to this disclosure. FIG. 4A includes a left side and a right side. As described in more detail below, the left side of FIG. 4A illustrates the generation of a PCC model (referred to as the PCC) to model (e.g., map) the relationship between one or more color values corresponding to an input (e.g., one or more color values corresponding to a first color space, such as RGB, destined for display by a display) and one or more color values corresponding to an output (e.g., one or more measured color values corresponding to a second color space, such as XYZ) derived from measuring the output of the display on which the input is displayed. In some examples, the input may correspond to one or more color tests. In the example of FIG. 4A, display calibration device 14 may be configured to predict values using the PCC that models the input and the output. The predicted values may be used to generate scaling factors. The right side of FIG. 4A illustrates an example of color management for a display for which the scaling factors are used to adjust the gamut of a display (e.g., display 20 of display device 12) to achieve a desired white point resulting in white point calibration of the display. For example, the right side of FIG. 4A illustrates an example of color management for a display for which the scaling factors are used to adjust one or more color values of display data (e.g., an image) destined for presentment by a display (e.g., display 20 of display device 12) to achieve a desired white point resulting in white point calibration of the display.

Method 400 may be performed by display calibration device 14 to perform display calibration (e.g., white point calibration) on display device 12. For example, one or more processes shown in FIG. 4A may be performed by display calibration device 14, and one or more processes shown in FIG. 4A may be performed by display device 12 and/or display 20 of display device 12 using data generated by display calibration device 14 to calibrate one or more display features of display 20. For example, one or more processes of FIG. 4A may be performed by one or more processors of one or more devices, such as one or more processors of display calibration device 14 and/or one or more processors of display device 12 (including one or more processors of display device 12 and/or display 20). In some examples, the left side may be performed by one or more processors of display calibration device 14, and the right side may be performed by one or more processors of display device 12. For example, the right side may be performed by one or more processors of display 20, one or more processors of display device 12 (e.g., a CPU or a display processor), and the like. In some examples, the one or more display features may include white point. In other examples, the one or more display features may include gamut mapping display 20 to conform to a color specification (e.g., sRGB).

In the example of FIG. 4A, display calibration device 14 may be configured to provide an input of display data to a target display (e.g., target display 21) to be modeled (402).

In some examples, the input of display data may include or otherwise be referred to as one or more tests, image tests, color tests, training sets, or modeling sets. As used herein, the terms tests, image tests, color tests, training sets, and modeling sets are interchangeable. As used herein, a test, image test, color test, training set, and modeling set may refer to an image including one or more pixels with each pixel being defined by a color value for each channel in a color space (e.g., the RGB color space). In some examples, each image test may include a single color or a plurality of colors. Each color in an image test may be represented by an area in the image. For example, one exemplary image test may be a single rectangle of uniform color. In this example, the plurality of color values corresponding to the single rectangle of uniform color correspond to a plurality of pixels, each pixel having the same color value for each channel (e.g., the same RGB values for each channel in an RGB color space example) since this example involves a single rectangle of uniform color. As another example, as used herein, an image test may refer to one or more colors presented in any area in combination and/or in one or more sequences. For example, an image test may comprise two images for presentment in sequence. The first image may include a single shape of uniform color, and the second image may include a plurality of shapes with each shape being uniform in color. The plurality of shapes may be the same or different in color. In the example of FIG. 4A, one or more image tests (e.g., input display data) may include colors that are close to or otherwise constitute a white point (e.g., a desired white point).

In some examples, an image test may include one or more images; and if more than one image, each image test may include a sequence images to be displayed in a particular order with each image being presented for the same or different durations of time subject to the particular image test. In examples involving white point calibration, the one or more colors in the one or more image tests may be colors that are close to or otherwise constitute a white point. As used herein, the terms the terms tests, image tests, color tests, training sets, and modeling sets may refer to display data stored in a memory accessible by display calibration device 14 for input to a display for measurement thereof.

For example, display calibration device 14 may be configured to output display data (e.g., one or more image tests) to a target display (e.g., target display 21). In this example, the display data output by display calibration device 14 constitutes an input of display data to a target display (e.g., target display 21). In some examples, the input of display data (or, more simply, input) may conform to a color space (e.g., RGB), which may conform to a color specification (e.g., sRGB). In such examples, the input may be linear or non-linear. For example, the input may comprise linear RGB values or non-linear RGB values (e.g., gamma compressed RGB values).

It is understood that providing an input to a target display (e.g., target display 21) may include providing an input to a display device (e.g., display device 12) that is configured to process display data (e.g., the input provided by display calibration device 14) such that the input display data is presented on a display (e.g., display 20) of the display device. It is therefore also appreciated that display calibration device 14 may be configured to provide an input to display device 12 for which display device 12 is configured to process such that the input received from display calibration device 14 is presented by display 20 (or a display different from display 20 and/or a display otherwise not associated with display device 12). In this example, display 20 may constitute the target display. It is understood that some examples provided herein refer to target display 21. In view of the definition of target display 21 described herein, reference to target display 21 includes reference to a target display that may be display 20 or may not be display 20. Therefore, while an example may be provided as "target display 21 or display 20," such an example is included to enhance readability, but it is understood that reference to "target display 21" alone refers to a target display that may be display 20 or may not be display 20.

Display calibration device 14 may be configured to measure the target display (404). For example, display calibration device 14 may be configured to measure the target display (e.g., target display 21 or display 20 of display device 12) when displaying the input of display data. For example, display calibration device 14 may be configured to measure one or more color values displayed by the target display when displaying the input of display data. In some examples, the one or more color values may be measured using colorimeter 30. In other examples, the one or more color values may be measured using a colorimeter of a device separate from display calibration device 14. In such examples, display calibration device 14 may be configured to receive one or more measured color values from colorimeter 30 or from the colorimeter of a device separate from display calibration device 14.

In some examples, the one or more color measured color values may refer to values corresponding to light measurement. In such examples, the one or more measured color values may refer to values in the XYZ color space. For example, when the input is an R'G'B' image test (meaning that the image test includes gamma compressed RGB values), display calibration device 14 may be configured to measure the color values displayed by the target display when the target display is displaying the R'G'B' image test. In some examples, any colorimeter (e.g., colorimeter 30 of display calibration device 14 or a colorimeter of a different device) may be configured to measure the color values in the XYZ color space. It is therefore understood that the target display may be configured to display input display data corresponding to a first color space while one or more colors displayed by the target device are measured in a second color space. For example, the target display may be configured to display input display data output by display calibration device 14 (or some other device) in a first color space while display calibration device 14 (or some other measuring device) may be configured to measure the input display data presented by the target display in a second color space. Similarly, it is understood that display calibration device 14 may be configured to output display data in a first color space destined for presentment by the target display, and that display calibration device 14 may be configured to measure, in a second color space, color values presented by the target display when presenting the input display data presented by the target display. As described herein, the colorimeter 30 of display calibration device 14 may be configured to measure displayed color values, and store the measured color values in a memory (e.g., memory 24 or a memory accessible by display calibration device 14).

Display calibration device 14 may be configured to remove compression (e.g., gamma compression) when the input of display data is compressed to obtain uncompressed values corresponding to the input of display data (406). For example, when the input of display data is an R'G'B' image test, display calibration device 14 may be configured to remove gamma compression to obtain linear RGB values corresponding to the non-linear R'G'B' values of the R'G'B' image test.

Display calibration device 14 may be configured to model a mapping (e.g., a relationship) between one or more color values corresponding to the input of display data and one or more measured color values (408). For example, display calibration device 14 may be configured to model a mapping between one or more linear color values in a first color space (e.g., RGB) and one or more measured color values in a second color space (e.g., XYZ). For example, display calibration device 14 may be configured to use one or more measured XYZ values derived from measuring the target display (e.g., target display 21 or display 20) while displaying an image test and linear RGB values corresponding to the image test to model a mapping between linear RGB and XYZ values. As another example, display calibration device 14 may be configured to use color values measured in a first color space (e.g., XYZ) and color values in a second color space (e.g., RGB) corresponding to the input display data to model a mapping between linear color values corresponding to the first color space and linear color values corresponding to the second color space. In some examples, the model may include a polynomial color correction (PCC) response-surface model. For example, the model may include a 3×11 PCC response-surface model that includes eleven coefficients for each color channel in a three channel color space (forming a 3×11 matrix).

Display calibration device 14 may be configured to calculate or otherwise predict one or more color values for a specified white point (410). The specified white point may correspond to D65, D50, 8200 degrees Kelvin on the Planckian locus, or any other white point defined by any color space and/or color specification. The specified white point may be specified in terms of one or more color values corresponding to a color space. For example, if the specified white point is in the XYZ color space, then the specified white point may be specified by a specified X color value, a specified Y color value, and a specified Z color value. As another example, if the specified white point is in the xyY color space, then the specified white point may be specified by a specified x color value, a specified y color value, and a specified Y color value.

For example, display calibration device 14 may be configured to calculate or otherwise predict one or more color values corresponding to the color space of the input display data for a specified white point using the model mapping the one or more measured color values corresponding to the second color space to the one or more color values corresponding to the first color space. In some examples, the second color space may be XYZ and the first color space may be RGB. The specified white point may be defined in term of XYZ color values, which may be input into the model to generate predicted RGB values corresponding to the specified white point in terms RGB instead of XYZ. Otherwise described, referring to the example involving a model mapping RGB and XYZ values, the model maps actual color values displayed in the XYZ color space and correlates (e.g., maps) those actual color values input for display in the RGB color space.

Display calibration device 14 may be configured to generate one or more scaling factors (412). In some examples, display calibration device 14 may be configured to generate one or more scaling factors based on one or more predicted color values and one or more color values corresponding to the input display data. The one or more color values corresponding to the input display data may include one or more linear color values corresponding to one or more non-linear color values of the input display data.

Display calibration device 14 may be configured to provide (e.g., transmit via a wired or wireless communication medium) the scaling factors to display device 12 (414). The arrow between blocks 412 and 420 also depicts that it is the scaling factors that enable color correction (e.g., polynomial color correction). Display device 12 may be configured to store the scaling factors in a memory (e.g., memory 18). In some examples, display calibration device 14 may be configured to store the scaling factors in a memory (e.g., memory 24). In some examples, scaling factors may be referred to as color adjustment scaling factors, color value adjustment scaling factors, color correction scaling factors, white point calibration scaling factors, gamut scaling factors, and the like.

In some examples, the scaling factors may be a ratio between a white point (e.g., one white point in the 8-bit RGB color space includes (255, 255, 255)) and predicted color values. The white point may be described with respect to a color space and/or a display. For example, the scaling factors may be described as being a ratio between a white point of a color space and/or display and predicted colors values. In an example where the color space is RGB, the ratio may be defined as (predicted RGB/a white point (e.g., (255, 255, 255) in an 8-bit RGB color space example)). In some examples, the scaling factors may be a ratio between the actual color values corresponding to the input display data (e.g., a white in the input display data may correspond to (255,255,255) in an 8-bit RGB color space example)) and the predicted color values. In such examples, the ratio may be defined as (predicted color value/a white point). For example, an RGB compressed input image may include an area of pixels having 8-bit RGB values of (255, 255, 255) after having been decoded (e.g., after removing any gamma compression if gamma compressed). This area of pixels having RGB values of (255, 255, 255), which may correspond to an image test, may be displayed by the target display (e.g., target display 21). Display calibration device 14 may measure the target display (target display 21) when displaying this area of pixels resulting in measured values for this area of pixels. As described above, the measured values may correspond to measured XYZ values. In this example, after modeling the relationship between the input (e.g., the color values displayed) and the output (e.g., the measured values), calibration device 14 may predict the RGB values for a calibrated white point on display device 12 using the model by inputting desired XYZ values into the model. Display calibration device 14 may be configured to output predicted RGB values (e.g., RGB values that correspond to the XYZ values input into the model). In this example, the predicted RGB values may be (251, 240, 255). In this example, display calibration device 14 may convert the predicted RGB values into scaling factors by taking, for each channel, the predicted channel value and dividing it by the actual RGB value. In this example, the scaling factor for the red channel would be (251/255), the scaling factor for the green channel would be (240/255), and the scaling factor for the blue channel would be (255/255). In some examples, the scaling factor for any channel may be equal to or less than one.

Display device 12 and/or display 20 (e.g., one or more processors of display device 12 and/or display 20) may be configured to perform color correction (e.g., polynomial color correction) using the scaling factors (420). For example, one or more processors of display device 12 may be configured to output display data for display by display 20 (416). The display data may be in the same color space as the input display data displayed by the target device (e.g., target display 21) and/or output by display calibration device 14 for presentment by the target display. For example, if the model generated by display calibration device 14 correlates linear RGB values corresponding to the input to measured XYZ values measured by, for example, the colorimeter of display calibration device 14 (or a colorimeter of another device), then the display data at block 416 may be in the RGB color space. In such an example, the display data at block 416 may include uncompressed or compressed RGB color values.

Display device 12 and/or display 20 (e.g., one or more processors of display device 12 and/or display 20) may perform input gamma correction (IGC) on display data destined for presentment by display 20 (418). Display device 12 and/or display 20 (e.g., one or more processors of display device 12 and/or display 20) may utilize the scaling factors to adjust one or more color values corresponding to the display data (e.g., all color values corresponding to the display data) (420). Since the scaling factors in this example relate to adjusting the display data to correspond to a specified white point when displayed by display 20, display device 12 and/or display 20 (e.g., one or more processors of display device 12 and/or display 20) may be configured to adjust the white point of the display data at block 420.

Since the adjustment to the one or more color values corresponding to the display data at block 420 affects the entire image (i.e., in some examples, display data may be referred to as an image), the color values corresponding to the display data not close to a white point (e.g., a fully saturated primary color, such as red in an 8-bit RGB example represented by (255, 0, 0)) are also adjusted based on the scaling factors. However, the color adjustment enabled by the scaling factors enables display 20 to present display data corresponding to a specified white point. Display device 12 and/or display 20 (e.g., one or more processors of display device 12 and/or display 20) may perform panel gamma correction (PGC) on color corrected display data (422). For example, display device 12 and/or display 20 (e.g., one or more processors of display device 12 and/or display 20) may be configured to perform PGC to code luminance or tristimulus values. As another example, display device 12 and/or display 20 (e.g., one or more processors of display device 12 and/or display 20) may be configured to perform PGC to compress RGB values of the image and/or other display data into R'G'B' values. Display 20 may then display images/video using the calibrated white point and the PGC to achieve the desired performance (424).

It is therefore understood that FIG. 4A and the examples discussed in relation thereto present examples illustrating how display calibration device 14 may be configured to calibrate and/or adjust display 20 of display device 12. For example, display calibration device 14 may be configured to calibrate and/or adjust a white point of display 20 of display device 12 according to one or more techniques described with respect to FIG. 4A. For example, display calibration device 14 may be configured to calibrate and/or adjust display 20 of display device 12 by enabling display 20 and/or display device 12 to adjust display data destined for display by display 20 to achieve a different white point (e.g., a specified white point) than would otherwise be displayed absent calibration and/or adjustment according to one or more techniques described with respect to FIG. 4A.

Figure 4B:
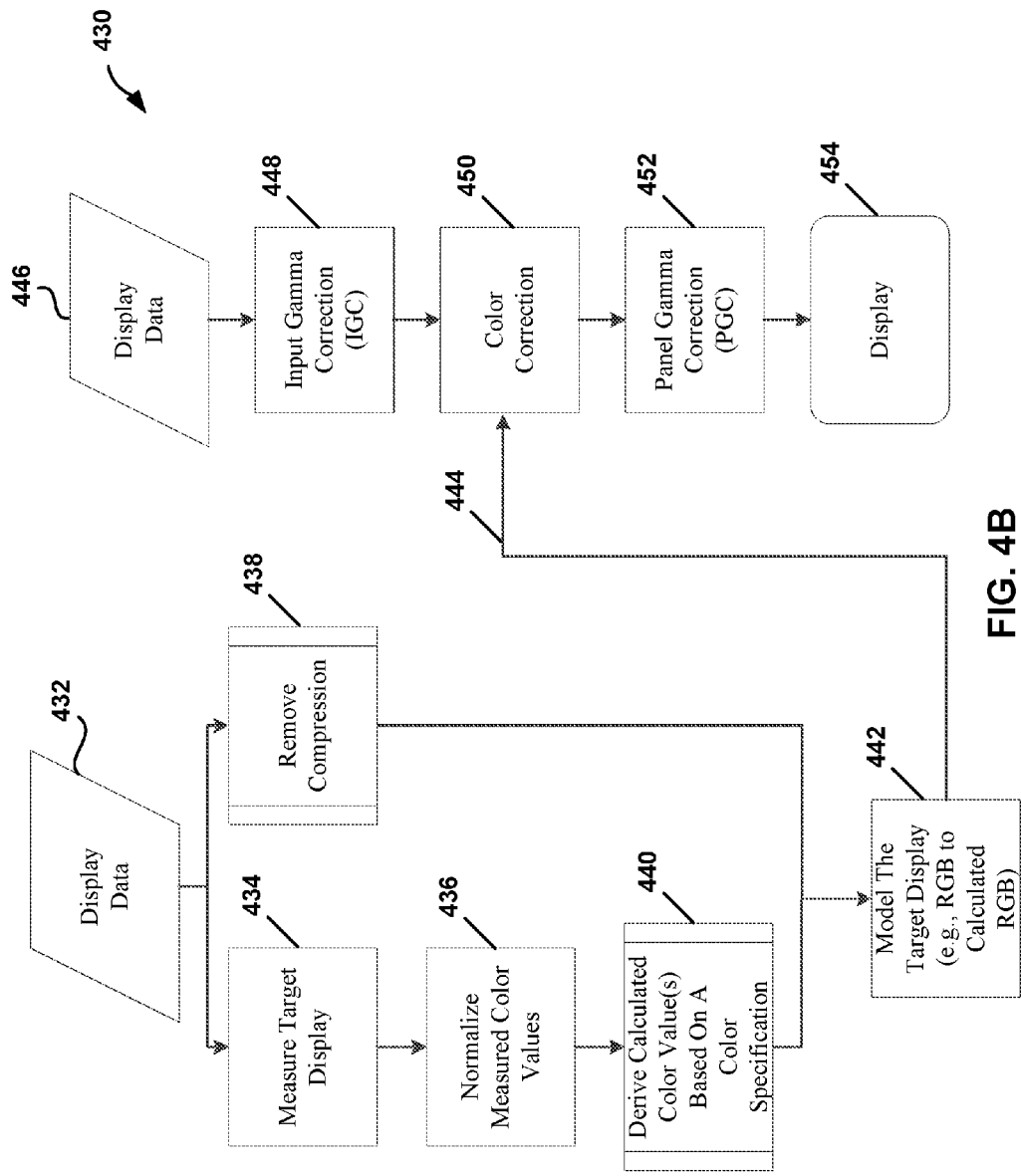
FIG. 4B is a flow diagram illustrating an example display calibration and adjustment technique for gamut mapping according to this disclosure.

FIG. 4B illustrates an example display calibration and adjustment technique according to this disclosure. FIG. 4B includes a left side and a right side. As described in more detail below, the left side of FIG. 4B illustrates the generation of a PCC model (referred to as the PCC or the model) to model (e.g., map) the relationship between one or more color values corresponding to an input (e.g., one or more color values corresponding to a first color space (e.g., RGB) destined for display by a display) and one or more calculated color values (e.g., one or more calculated color values corresponding to the first color space. In some examples, the one or more calculated color values may be calculated using a color specification and one or more color measured color values corresponding to a second color space (e.g., XYZ). For example, the one or more measured color values in the second color space may be input into the color specification to determine the corresponding one or more colors in the first color space according to the color specification. In this example, the color specification may map or otherwise relate a first color space to a second color space (and vice versa).

The right side of FIG. 4B illustrates an example of color management for a display for which the polynomial color correction (PCC) is used to adjust the gamut of a display (e.g., display 20 of display device 12) to achieve a desired gamut resulting in gamut mapping of the display. In some examples, the desired gamut may be defined by a color specification (e.g., sRGB). The right side of FIG. 4B illustrates an example of color management for a display for which the PCC is used to adjust one or more color values of display data (e.g., an image) destined for presentment by a display (e.g., display 20 of display device 12) to achieve a desired (e.g., specified) gamut resulting in gamut mapping of the display. In some examples of FIG. 4B, the desired gamut may be defined by sRGB, meaning that the method 430 may result in mapping the gamut of display 20 to sRGB based on performance of a target display (e.g., target display 21) such that display data, when displayed by display 20, appears to or actually conforms to sRGB. For example, display data, when displayed by display 20, may more closely resemble the gamut of a specified color specification than would otherwise be displayed absent calibration and/or adjustment according to one or more of the display calibration and adjustment techniques described in this disclosure.

Method 430 may be performed by display calibration device 14 to perform display calibration (e.g., gamut mapping) of display data on display device 12. For example, one or more processes shown in FIG. 4B may be performed by display calibration device 14, and one or more processes shown in FIG. 4B may be performed by display device 12 and/or display 20 of display device 12 using data generated by display calibration device 14 to calibrate one or more display features of display 20. For example, one or more processes of FIG. 4B may be performed by one or more processors of one or more devices, such as one or more processors of display calibration device 14 and/or one or more processors of display device 12 (including one or more processors of display device 12 and/or display 20). In some examples, the left side may be performed by one or more processors of display calibration device 14, and the right side may be performed by one or more processors of display device 12. For example, the right side may be performed by one or more processors of display 20, one or more processors of display device 12 (e.g., a CPU or a display processor), and the like. In some examples, the one or more display features may include the gamut, such as gamut mapping display 20 to conform to a color specification (e.g., sRGB).

In the example of FIG. 4B, display calibration device 14 may be configured to provide an input of display data to a target display (e.g., target display 21) to be modeled (432). In some examples, the input of display data may include or otherwise be referred to as one or more tests, image tests, color tests, training sets, or modeling sets as described herein (e.g., throughout this disclosure).

For example, display calibration device 14 may be configured to output display data (e.g., one or more image tests) to a target display (e.g., target display 21). In this example, the display data output by display calibration device 14 constitutes an input of display data to a target display (e.g., target display 21). In some examples, the input of display data (or, more simply, input) may conform to a color space (e.g., RGB), which may conform to a color specification (e.g., sRGB). In such examples, the input may be linear or non-linear. For example, the input may comprise linear RGB values or non-linear RGB values (e.g., gamma compressed RGB values).

It is understood that providing an input to a target display (e.g., target display 21) may include providing an input to a display device (e.g., display device 12) that is configured to process display data (e.g., the input provided by display calibration device 14) such that the input display data is presented on a display (e.g., display 20) of the display device. It is therefore also appreciated that display calibration device 14 may be configured to provide an input to display device 12 for which display device 12 is configured to process such that the input received from display calibration device 14 is presented by display 20 (or a display different from display 20 and/or a display otherwise not associated with display device 12). In this example, display 20 may constitute the target display. It is understood that some examples provided herein refer to target display 21. In view of the definition of target display 21 described herein, reference to target display 21 includes reference to a target display that may be display 20 or may not be display 20. Therefore, while an example may be provided as "target display 21 or display 20," such an example is included to enhance readability, but it is understood that reference to "target display 21" alone refers to a target display that may be display 20 or may not be display 20.

Display calibration device 14 may be configured to measure the target display (434). For example, display calibration device 14 may be configured to measure the target display (e.g., target display 21 or display 20 of display device 12) when displaying the input of display data. For example, display calibration device 14 may be configured to measure one or more color values displayed by the target display when displaying the input of display data. In some examples, the one or more color values may be measured using colorimeter 30. In other examples, the one or more color values may be measured using a colorimeter of a device separate from display calibration device 14. In such examples, display calibration device 14 may be configured to receive one or more measured color values from colorimeter 30 or from the colorimeter of a device separate from display calibration device 14.

In some examples, the one or more color measured color values may refer to values corresponding to light measurement. In such examples, the one or more measured color values may refer to values in the XYZ color space. For example, when the input is an R'G'B' image test (meaning that the image test includes gamma compressed RGB values), display calibration device 14 may be configured to measure the color values displayed by the target display when the target display is displaying the R'G'B' image test. In some examples, any colorimeter (e.g., colorimeter 30 of display calibration device 14 or a colorimeter of a different device) may be configured to measure the color values in the XYZ color space. It is therefore understood that the target display may be configured to display input display data corresponding to a first color space while one or more colors displayed by the target device are measured in a second color space. For example, the target display may be configured to display input display data output by display calibration device 14 (or some other device) in a first color space while display calibration device 14 (or some other measuring device) may be configured to measure the input display data presented by the target display in a second color space. Similarly, it is understood that display calibration device 14 may be configured to output display data in a first color space destined for presentment by the target display, and that display calibration device 14 may be configured to measure, in a second color space, color values presented by the target display when presenting the input display data presented by the target display. As described herein, the colorimeter 30 of display calibration device 14 may be configured to measure displayed color values, and store the measured color values in a memory (e.g., memory 24 or a memory accessible by display calibration device 14).

Display calibration device 14 may be configured to normalize each of the one or more measured color values (436). For example, display calibration device 14 may be configured to normalize each of the one or more measured color values by one or more measured values corresponding to a first channel. For example, in an example where the one or more measured color values correspond to the XYZ color space, the X, Y, and Z measured values may be normalized based on the Ys value (e.g., the luminance component of a specified white in the XYZ color space). In this example, display calibration device 14 may be configured to determine the normalized X value by dividing the measured X value by the Ys value. Similarly, display calibration device 14 may be configured to determine the normalized Z value by dividing the measured Z value by the Ys value. Display calibration device 14 may be configured to determine the normalized Y value by dividing the measured Y value by the Ys value, which equals 1. In such an example, the normalized values for three sets of measured XYZ values (X1, Y1, Z1), (X2, Y2, Z2), and (X3, Y3, Z3) may respectively be calculated as (X1/Ys, Y1/Ys, Z1/Ys), (X2/Ys, Y2/Ys, Z2/Ys), and (X3/Ys, Y3/Ys, Z3/Ys).

Display calibration device 14 may be configured to remove compression (e.g., gamma compression) when the input of display data is compressed to obtain uncompressed values corresponding to the input of display data (438). For example, when the input of display data is an R'G'B' image test, display calibration device 14 may be configured to remove gamma compression to obtain linear RGB values corresponding to the non-linear R'G'B' values of the R'G'B' image test.

Display calibration device 14 may be configured to calculate (e.g., generate) one or more color values based on a color specification (440). In some examples, the one or more color values based on the color specification and one or more color values corresponding to the input of display data are in the same color space (e.g., a first color space). The color specification may map one or more color values of a second color space to one or more color values of the first color space. In such examples, the first color space may correspond to the RGB color space, the second color space may correspond to the XYZ color space, and the color specification may be sRGB. Display calibration device 14 may be configured to use the color specification to convert one or more measured color values in the second color space to one or more color values in the first color space. The one or more color values generated as a result of this conversion may be referred to as the one or more calculated color values. For example, display calibration device 14 may be configured to convert one or more XYZ color values (e.g., one or more measured color values) to one or more RGB color values using sRGB that maps XYZ color values to RGB color values.

Display calibration device 14 may be configured to model a mapping (e.g., a relationship between the input display data and the measured display data in the same color space (442). For example, display calibration device 14 may be configured to model a mapping (e.g., a relationship) between one or more color values corresponding to the input display data in the first color space (e.g., RGB) and the one or more calculated color values also in the first color space. In an example where the first color space is RGB, the model maps RGB color values to RGB color values. For example, an input of an RGB color value into the model results in an RGB value as an output.

In some examples, the model may include a polynomial color correction (PCC) response-surface model. In some examples, the model may include a 3×11 PCC response-surface model that includes eleven coefficients for each color channel in a three channel color space (forming a 3×11 matrix). As another example, the model may include a 3×8 PCC response-surface model that includes eight coefficients for each of the color channels (forming a 3×8 matrix) in a three channel color space.

Display calibration device 14 may be configured to provide (e.g., transmit via a wired or wireless communication medium) the model (e.g., the model mapping color values in the first color space to calculated color values in the first color space) to display device 12 (444). The arrow between blocks 442 and 450 also depicts that it is the model that enables color correction (e.g., polynomial color correction). Display device 12 may be configured to store the model in a memory (e.g., memory 18). In some examples, display calibration device 14 may be configured to store the model in a memory (e.g., memory 24). In some examples, the model may be referred to as a color adjustment model, color value adjustment model, color correction model, gamut model, a PCC model, and the like. The model may include second order or higher terms.

Display device 12 and/or display 20 (e.g., one or more processors of display device 12 and/or display 20) may be configured to perform color correction (e.g., polynomial color correction) using the model (450). For example, one or more processors of display device 12 may be configured to output display data for display by display 20 (446). The display data may be in the same color space as the input display data displayed by the target device (e.g., target display 21) and/or output by display calibration device 14 for presentment by the target display. For example, if the model generated by display calibration device 14 correlates (e.g., maps) linear RGB values corresponding to the input to calculated linear RGB values, then the display data at block 446 may be in the RGB color space. In such an example, the display data at block 446 may include uncompressed or compressed RGB color values.

Display device 12 and/or display 20 (e.g., one or more processors of display device 12 and/or display 20) may perform input gamma correction (IGC) on display data destined for presentment by display 20 (448). Display device 12 and/or display 20 (e.g., one or more processors of display device 12 and/or display 20) may utilize the model to adjust one or more color values corresponding to the display data (e.g., all color values corresponding to the display data) (450). For example, for each color value of a color channel input into the model, an adjusted color value is output or otherwise generated. The adjusted color values corresponding to the display data may be referred to as color corrected display data.

Display device 12 and/or display 20 (e.g., one or more processors of display device 12 and/or display 20) may perform panel gamma correction (PGC) on color corrected display data (452). For example, display device 12 and/or display 20 (e.g., one or more processors of display device 12 and/or display 20) may be configured to perform PGC to code luminance or tristimulus values. As another example, display device 12 and/or display 20 (e.g., one or more processors of display device 12 and/or display 20) may be configured to perform PGC to compress RGB values of the image and/or other display data into R'G'B' values. Display 20 may then display images/video using the color corrected display data that has been panel gamma corrected (454). The color corrected display data and/or the corrected display data that has been panel gamma corrected may also be referred to as a gamut mapped or gamut adjusted display data.

It is therefore understood that FIG. 4B and the examples discussed in relation thereto present examples illustrating how display calibration device 14 may be configured to calibrate and/or adjust display 20 of display device 12. For example, display calibration device 14 may be configured to calibrate and/or adjust the gamut (e.g., the perceived gamut) of display 20 of display device 12 according to one or more techniques described with respect to FIG. 4B. For example, display calibration device 14 may be configured to calibrate and/or adjust the gamut (e.g., the perceived gamut) of display 20 of display device 12 based on measured performance of a target display (e.g., target display 21) according to one or more techniques described with respect to FIG. 4B. For example, display calibration device 14 may be configured to calibrate and/or adjust display 20 of display device 12 by enabling display 20 and/or display device 12 to adjust display data destined for display by display 20 to achieve a different and/or adjusted gamut than would otherwise be displayed absent calibration and/or adjustment according to one or more techniques described with respect to FIG. 4B. The different or adjusted gamut may correspond to a gamut that is specified by a color specification (e.g., sRGB). As another example, display calibration device 14 may be configured to calibrate and/or adjust display 20 of display device 12 by enabling display 20 and/or display device 12 to adjust display data destined for display by display 20 to match, approach, or more closely resemble the gamut of a specified color specification than would otherwise be displayed absent calibration and/or adjustment according to one or more techniques described with respect to FIG. 4B.

Figure 4C:
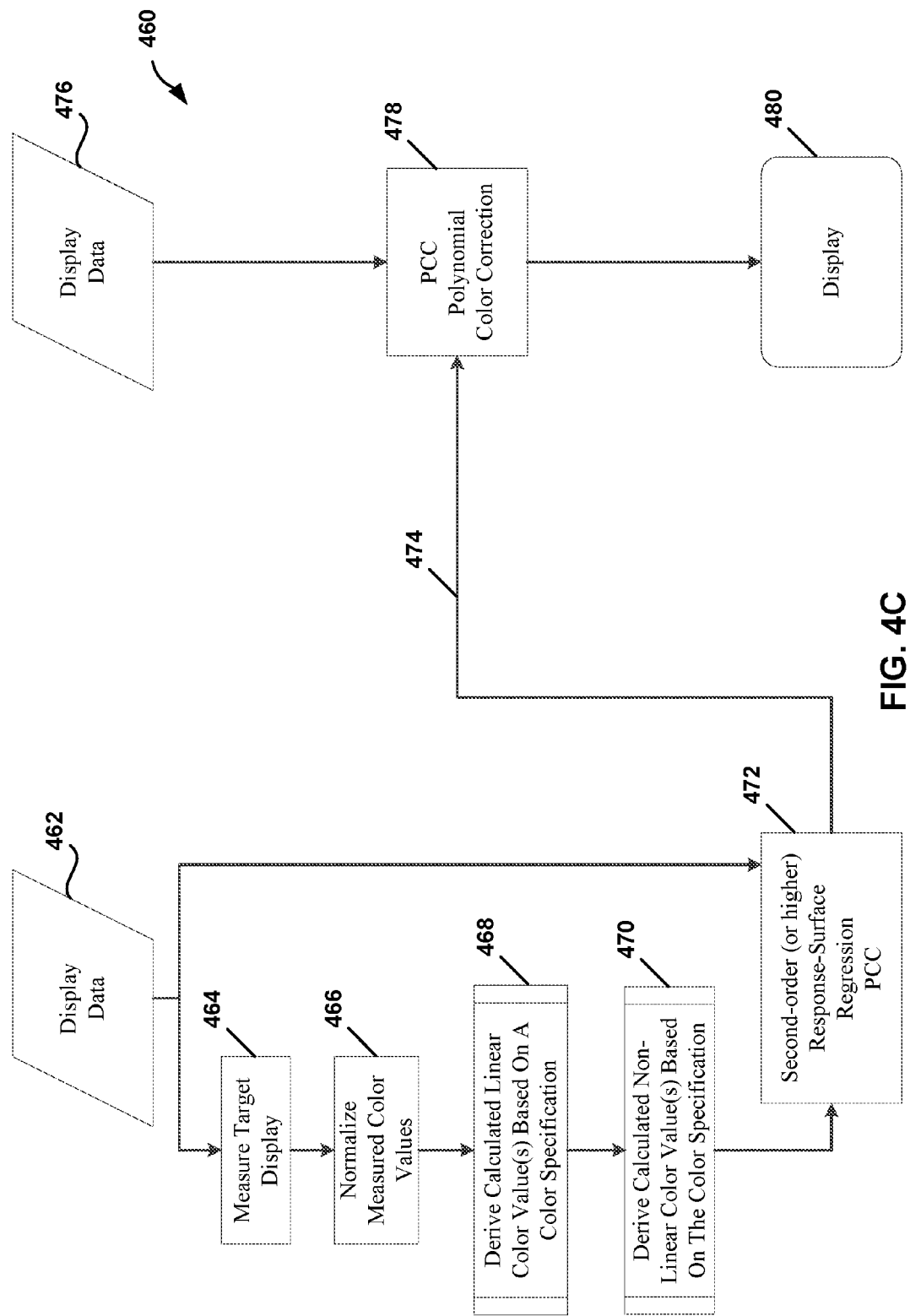
FIG. 4C is a flow diagram illustrating an example display calibration and adjustment technique for gamut mapping according to this disclosure.

FIG. 4C illustrates an example display calibration and adjustment technique according to this disclosure. FIG. 4C includes a left side and a right side. As described in more detail below, the left side of FIG. 4C illustrates the generation of a PCC model (referred to as the PCC or the model) to model (e.g., map) the relationship between one or more color values corresponding to an input (e.g., one or more color values corresponding to a first color space (e.g., RGB) destined for display by a display) and one or more calculated color values (e.g., one or more calculated color values corresponding to the first color space. In some examples, the one or more calculated color values may be calculated using a color specification and one or more color measured color values corresponding to a second color space (e.g., XYZ). For example, the one or more measured color values in the second color space may be input into the color specification to determine the corresponding one or more colors in the first color space according to the color specification. In this example, the color specification may map or otherwise relate a first color space to a second color space (and vice versa).

The right side of FIG. 4C illustrates an example of color management for a display for which the polynomial color correction (PCC) is used to adjust the gamut of a display (e.g., display 20 of display device 12) to achieve a desired gamut resulting in gamut mapping of the display. In some examples, the desired gamut may be defined by a color specification (e.g., sRGB). The right side of FIG. 4C illustrates an example of color management for a display for which the PCC is used to adjust one or more color values of display data (e.g., an image) destined for presentment by a display (e.g., display 20 of display device 12) to achieve a desired (e.g., specified) gamut resulting in gamut mapping of the display. In some examples of FIG. 4C, the desired gamut may be defined by sRGB, meaning that the method 430 may result in mapping the gamut of display 20 to sRGB based on performance of a target display (e.g., target display 21) such that display data, when displayed by display 20, appears to or actually conforms to sRGB. For example, display data, when displayed by display 20, may more closely resemble the gamut of a specified color specification than would otherwise be displayed absent calibration and/or adjustment according to one or more of the display calibration and adjustment techniques described in this disclosure.

Method 460 may be performed by display calibration device 14 to perform display calibration (e.g., gamut mapping) of display data on display device 12. For example, one or more processes shown in FIG. 4C may be performed by display calibration device 14, and one or more processes shown in FIG. 4C may be performed by display device 12 and/or display 20 of display device 12 using data generated by display calibration device 14 to calibrate one or more display features of display 20. For example, one or more processes of FIG. 4C may be performed by one or more processors of one or more devices, such as one or more processors of display calibration device 14 and/or one or more processors of display device 12 (including one or more processors of display device 12 and/or display 20). In some examples, the left side may be performed by one or more processors of display calibration device 14, and the right side may be performed by one or more processors of display device 12. For example, the right side may be performed by one or more processors of display 20, one or more processors of display device 12 (e.g., a CPU or a display processor), and the like. In some examples, the one or more display features may include the gamut, such as gamut mapping display 20 to conform to a color specification (e.g., sRGB).

In the example of FIG. 4C, display calibration device 14 may be configured to provide an input of display data to a target display (e.g., target display 21) to be modeled (462). In some examples, the input of display data may include or otherwise be referred to as one or more tests, image tests, color tests, training sets, or modeling sets as described herein (e.g., throughout this disclosure). For example, display calibration device 14 may be configured to output display data (e.g., one or more image tests) to a target display (e.g., target display 21). In this example, the display data output by display calibration device 14 constitutes an input of display data to a target display (e.g., target display 21).

In some examples, the input of display data (or, more simply, input) may conform to a color space (e.g., RGB), which may conform to a color specification (e.g., sRGB). In such examples, the input may be non-linear. For example, the input may comprise non-linear RGB values (e.g., gamma compressed RGB values). It is understood that providing an input to a target display (e.g., target display 21) may include providing an input to a display device (e.g., display device 12) that is configured to process display data (e.g., the input provided by display calibration device 14) such that the input display data is presented on a display (e.g., display 20) of the display device.

It is therefore also appreciated that display calibration device 14 may be configured to provide an input to display device 12 for which display device 12 is configured to process such that the input received from display calibration device 14 is presented by display 20 (or a display different from display 20 and/or a display otherwise not associated with display device 12). In this example, display 20 may constitute the target display. It is understood that some examples provided herein refer to target display 21. In view of the definition of target display 21 described herein, reference to target display 21 includes reference to a target display that may be display 20 or may not be display 20. Therefore, while an example may be provided as "target display 21 or display 20," such an example is included to enhance readability, but it is understood that reference to "target display 21" alone refers to a target display that may be display 20 or may not be display 20.

Display calibration device 14 may be configured to measure the target display (464). For example, display calibration device 14 may be configured to measure the target display (e.g., target display 21 or display 20 of display device 12) when displaying the input of display data. For example, display calibration device 14 may be configured to measure one or more color values displayed by the target display when displaying the input of display data. In some examples, the one or more color values may be measured using colorimeter 30. In other examples, the one or more color values may be measured using a colorimeter of a device separate from display calibration device 14. In such examples, display calibration device 14 may be configured to receive one or more measured color values from colorimeter 30 or from the colorimeter of a device separate from display calibration device 14.

In some examples, the one or more color measured color values may refer to values corresponding to light measurement. In such examples, the one or more measured color values may refer to values in the XYZ color space. For example, when the input is a non-linear image test (e.g., an R'G'B' image test, meaning that the image test includes gamma compressed RGB values), display calibration device 14 may be configured to measure the color values displayed by the target display when the target display is displaying the non-linear image test. In some examples, any colorimeter (e.g., colorimeter 30 of display calibration device 14 or a colorimeter of a different device) may be configured to measure the color values in the XYZ color space.

It is therefore understood that the target display may be configured to display input display data corresponding to a first color space while one or more colors displayed by the target device are measured in a second color space. For example, the target display may be configured to display input display data output by display calibration device 14 (or some other device) in a first color space while display calibration device 14 (or some other measuring device) may be configured to measure the input display data presented by the target display in a second color space. Similarly, it is understood that display calibration device 14 may be configured to output display data in a first color space destined for presentment by the target display, and that display calibration device 14 may be configured to measure, in a second color space, color values presented by the target display when presenting the input display data presented by the target display. As described herein, the colorimeter 30 of display calibration device 14 may be configured to measure displayed color values, and store the measured color values in a memory (e.g., memory 24 or a memory accessible by display calibration device 14).

Display calibration device 14 may be configured to normalize each of the one or more measured color values (466). For example, display calibration device 14 may be configured to normalize each of the one or more measured color values by one or more measured values corresponding to a first channel. For example, in an example where the one or more measured color values correspond to the XYZ color space, the X, Y, and Z measured values may be normalized based on the Ys value (e.g., the luminance component of a specified white in the XYZ color space). In this example, display calibration device 14 may be configured to determine the normalized X value by dividing the measured X value by the Ys value. Similarly, display calibration device 14 may be configured to determine the normalized Z value by dividing the measured Z value by the Ys value. Display calibration device 14 may be configured to determine the normalized Y value by dividing the measured Y value by the Ys value, which equals 1. In such an example, the normalized values for three sets of measured XYZ values (X1, Y1, Z1), (X2, Y2, Z2), and (X3, Y3, Z3) may respectively be calculated as (X1/Ys, Y1/Ys, Z1/Ys), (X2/Ys, Y2/Ys, Z2/Ys), and (X3/Ys, Y3/Ys, Z3/Ys).

Instead of being configured to remove compression (e.g., gamma compression) to obtain uncompressed values corresponding to the input of display data, display calibration device 14 may be configured to model non-linear values instead of linear values. For example, display calibration device 14 may be configured to calculate (e.g., generate) one or more linear color values based on a color specification (468). In some examples, the one or more linear color values based on the color specification and one or more non-linear color values corresponding to the input of display data are in the same color space (e.g., a first color space). The color specification may map one or more color values of a second color space to one or more linear color values of the first color space. In such examples, the first color space may correspond to the RGB color space, the second color space may correspond to the XYZ color space, and the color specification may be sRGB. Display calibration device 14 may be configured to use the color specification to convert one or more measured color values in the second color space to one or more linear color values in the first color space. The one or more linear color values generated as a result of this conversion may be referred to as the one or more calculated linear color values. For example, display calibration device 14 may be configured to convert one or more XYZ color values (e.g., one or more measured color values) to one or more linear RGB color values using sRGB that maps XYZ color values to linear RGB color values.

Display calibration device 14 may be configured to calculate (e.g., generate) one or more non-linear color values based on a color specification (470). For example, display calibration device 14 may be configured to gamma compress (or otherwise calculate gamma compressed color values), according to the sRGB color specification, the one or more linear RGB color values derived from using the sRGB color specification. As another example, display calibration device 14 may be configured to gamma compress, based on a color specification (e.g., the same color specification used to derive the calculated color values at block 468), the one or more calculated color values generated at block 468. The color specification used at block 470 may be the same color specification used at block 468. In some examples, the one or more non-linear color values based on the color specification and one or more color values corresponding to the input of display data are in the same color space (e.g., a first color space). In such examples, the first color space may correspond to the RGB color space and the color specification may be sRGB. Display calibration device 14 may be configured to use the color specification to convert one or more calculated linear color values to one or more non-linear color values in the first color space by, for example, gamma compressing (or otherwise calculate gamma compressed color values) the one or more calculated linear color values according to the color specification. The one or more non-linear color values generated as a result of this conversion may be referred to as the one or more calculated non-linear color values. For example, display calibration device 14 may be configured to convert one or more calculated linear RGB color values to one or more calculated non-linear RGB color values using sRGB. In some examples, the gamma compressed color values derived at block 470 may be referred to as calculated non-linear color values.

Display calibration device 14 may be configured to model a mapping (e.g., a relationship between the input display data and the measured display data in the same color space (472). For example, display calibration device 14 may be configured to model a mapping (e.g., a relationship) between one or more color values corresponding to the input display data in the first color space (e.g., RGB) and the one or more calculated non-linear color values also in the first color space. In an example where the first color space is RGB, the model maps R'G'B' color values to R'G'B' color values. For example, an input of an R'G'B' color value into the model results in an R'G'B' value as an output.

In some examples, the model may include a polynomial color correction (PCC) response-surface model. In some examples, the model may include a 3×11 PCC response-surface model that includes eleven coefficients for each color channel in a three channel color space (forming a 3×11 matrix). As another example, the model may include a 3×8 PCC response-surface model that includes eight coefficients for each of the color channels (forming a 3×8 matrix) in a three channel color space.

Display calibration device 14 may be configured to provide (e.g., transmit via a wired or wireless communication medium) the model to display device 12 (474). The arrow between blocks 472 and 478 also depicts that it is the model that enables color correction (e.g., polynomial color correction). Display device 12 may be configured to store the model in a memory (e.g., memory 18). In some examples, display calibration device 14 may be configured to store the model in a memory (e.g., memory 24). In some examples, the model may be referred to as a color adjustment model, color value adjustment model, color correction model, gamut model, a PCC model, and the like. The model may include second order or higher terms.

Display device 12 and/or display 20 (e.g., one or more processors of display device 12 and/or display 20) may be configured to perform color correction (e.g., polynomial color correction) using the model (478). For example, one or more processors of display device 12 may be configured to output display data for display by display 20 (476). The display data may be in the same color space as the input display data displayed by the target device (e.g., target display 21) and/or output by display calibration device 14 for presentment by the target display. For example, if the model generated by display calibration device 14 correlates (e.g., maps) non-linear RGB values corresponding to the input to calculated non-linear RGB values, then the display data at block 476 may be in the RGB color space. In such an example, the display data at block 476 may include uncompressed or compressed RGB color values.

Display device 12 and/or display 20 (e.g., one or more processors of display device 12 and/or display 20) may utilize the model to adjust one or more non-linear color values corresponding to the display data (e.g., all color values corresponding to the display data) (450). For example, for each non-linear color value of a color channel input into the model, an adjusted non-linear color value is output or otherwise generated. The adjusted non-linear color values corresponding to the display data may be referred to as color corrected display data. Display 20 may then display images/video using the color corrected display data (480). The color corrected display data may also be referred to as a gamut mapped or gamut adjusted display data.

Figure 4D:
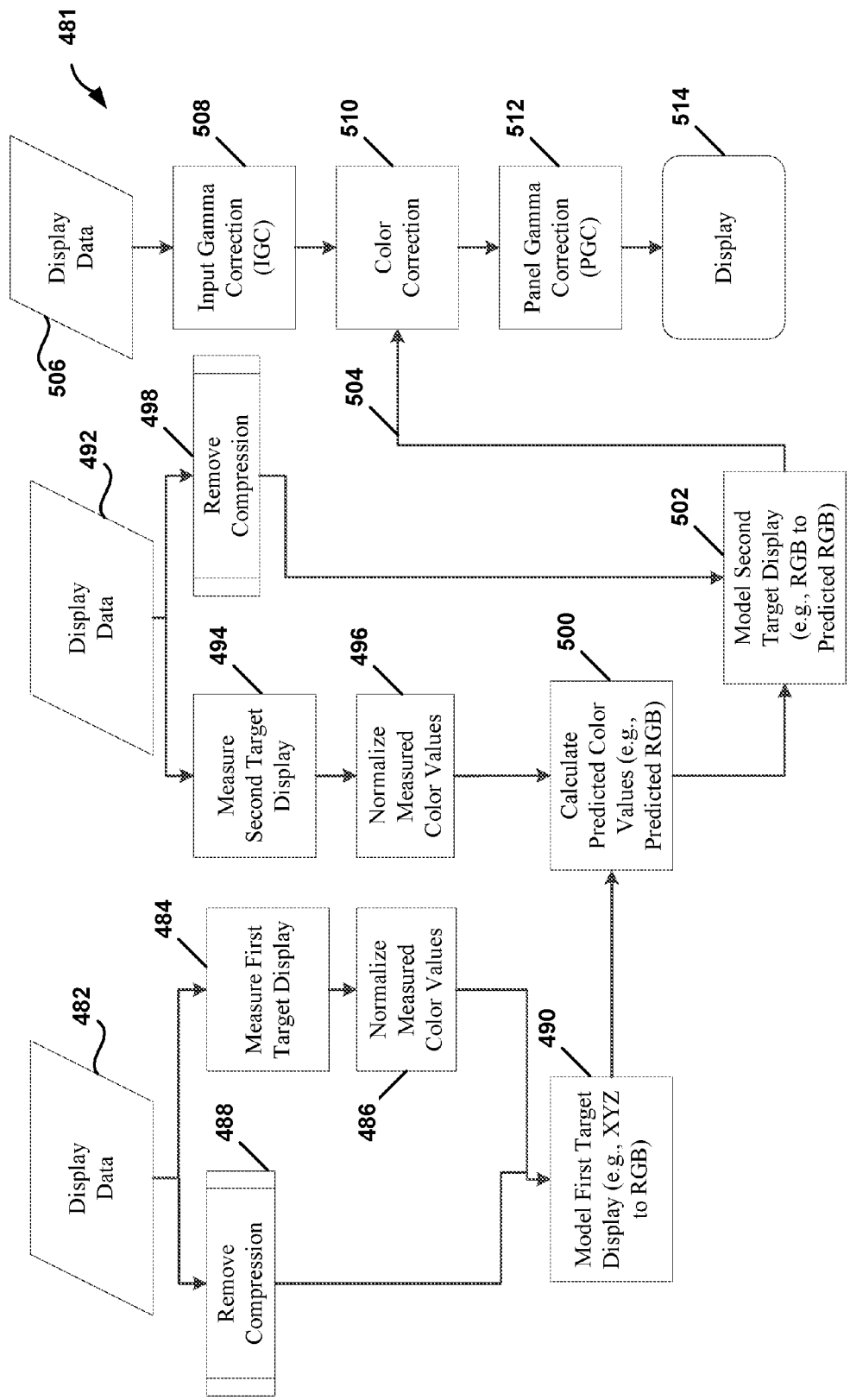
FIG. 4D is a flow diagram illustrating an example display calibration and adjustment technique for gamut mapping according to this disclosure.

FIG. 4D illustrates an example display calibration and adjustment technique according to this disclosure. FIG. 4D includes a left stage (blocks 482-490), a middle stage (block 492-502), and a right stage (blocks 506-514). As described in more detail below, method 481 illustrates the generation of two PCC models, one in the left stage and one in the middle stage. For example, the left stage of FIG. 4D illustrates the generation of a first PCC model (referred to as the PCC or the model) to model (e.g., map) the relationship between one or more color values corresponding to the input of display data and one or more measured color values. For example, the first model may map the relationship between one or more color values corresponding to an input (e.g., one or more color values corresponding to a first color space, such as RGB, destined for display by a display (e.g., target display 23)) and one or more color values corresponding to an output (e.g., one or more measured color values corresponding to a second color space, such as XYZ) derived from measuring the output of the display on which the input is displayed. In this example, target display 23 may be referred to as a golden display.

The middle stage of FIG. 4D illustrates the generation of a second PCC to model the displayed input on a second target display (e.g., target display 21) relative to the performance of the first target display (e.g., target display 23) and gamut map values based thereon. The second PCC is based on the first PCC.

The right stage of FIG. 4D illustrates an example of color management for a display for which the polynomial color correction (PCC) is used to adjust the gamut of a display (e.g., display 20 of display device 12) to achieve a desired gamut resulting in gamut mapping of the display. In some examples, the desired gamut may be defined by the gamut of the first target display (e.g., target display 23). However, since the gamut of the first target display may not be defined by documentation for a user, the gamut of the first target display may be identified or otherwise determined by measuring the performance of the first target display. For example, the polynomial color correction (PCC) may be used to adjust the gamut of a display (e.g., display 20 of display device 12) to match, approach, or more closely resemble the gamut of the first target display.

As another example, the right stage of FIG. 4D illustrates an example of color management for a display for which the PCC is used to adjust one or more color values of display data (e.g., an image) destined for presentment by a display (e.g., display 20 of display device 12) to achieve a desired (e.g., specified) gamut resulting in gamut mapping of the display. In this example, the specified gamut may be the gamut corresponding to the first target display. For example, the desired gamut may be defined by the performance of the first target display.

Method 480 may be performed by display calibration device 14 to perform display calibration (e.g., gamut mapping) of display data on display device 12. For example, one or more processes shown in FIG. 4D may be performed by display calibration device 14, and one or more processes shown in FIG. 4D may be performed by display device 12 and/or display 20 of display device 12 using data generated by display calibration device 14 to calibrate one or more display features of display 20. For example, one or more processes of FIG. 4D may be performed by one or more processors of one or more devices, such as one or more processors of display calibration device 14 and/or one or more processors of display device 12 (including one or more processors of display device 12 and/or display 20). In some examples, the left and middle stages may be performed by one or more processors of display calibration device 14, and the right stage may be performed by one or more processors of display device 12. For example, the right stage may be performed by one or more processors of display 20, one or more processors of display device 12 (e.g., a CPU or a display processor), and the like. In some examples, the one or more display features may include the gamut, such as gamut mapping display 20 based on the performance of the first target display (e.g., target display 23). In the example of FIG. 4D, display 20 may not constitute the first target display (e.g., target display 23) modeled in the left stage, and may not have any part number, model number, batch number, or identification number in common with display 20.

In the example of FIG. 4D, display calibration device 14 may be configured to provide an input of display data to a first target display (e.g., target display 23) to be modeled (482). In some examples, the input of display data may include or otherwise be referred to as one or more tests, image tests, color tests, training sets, or modeling sets as described herein (e.g., throughout this disclosure).

For example, display calibration device 14 may be configured to output display data (e.g., one or more image tests) to the first target display (e.g., target display 23). In this example, the display data output by display calibration device 14 constitutes an input of display data to the first target display (e.g., target display 23). In some examples, the input of display data (or, more simply, input) may conform to a color space (e.g., RGB), which may conform to a color specification (e.g., sRGB). In such examples, the input may be linear or non-linear. For example, the input may comprise linear RGB values or non-linear RGB values (e.g., gamma compressed RGB values).

Display calibration device 14 may be configured to measure the first target display (484). For example, display calibration device 14 may be configured to measure the first target display (e.g., target display 23) when displaying the input of display data. For example, display calibration device 14 may be configured to measure one or more color values displayed by the first target display (e.g., target display 23) when displaying the input of display data. In some examples, the one or more color values may be measured using colorimeter 30. In other examples, the one or more color values may be measured using a colorimeter of a device separate from display calibration device 14. In such examples, display calibration device 14 may be configured to receive one or more measured color values from colorimeter 30 or from the colorimeter of a device separate from display calibration device 14.

In some examples, the one or more color measured color values may refer to values corresponding to light measurement. In such examples, the one or more measured color values may refer to values in the XYZ color space. For example, when the input is an R'G'B' image test (meaning that the image test includes gamma compressed RGB values), display calibration device 14 may be configured to measure the color values displayed by the first target display (e.g., target display 23) when the first target display is displaying the R'G'B' image test. In some examples, any colorimeter (e.g., colorimeter 30 of display calibration device 14 or a colorimeter of a different device) may be configured to measure the color values in the XYZ color space. It is therefore understood that the first target display (e.g., target display 23) may be configured to display input display data corresponding to a first color space while one or more colors displayed by the first target device are measured in a second color space. For example, the first target display may be configured to display input display data output by display calibration device 14 (or some other device) in a first color space while display calibration device 14 (or some other measuring device) may be configured to measure the input display data presented by the first target display in a second color space. Similarly, it is understood that display calibration device 14 may be configured to output display data in a first color space destined for presentment by the first target display (e.g., target display 23), and that display calibration device 14 may be configured to measure, in a second color space, color values presented by the first target display when presenting the input display data presented by the first target display. As described herein, the colorimeter 30 of display calibration device 14 may be configured to measure displayed color values, and store the measured color values in a memory (e.g., memory 24 or a memory accessible by display calibration device 14).

Display calibration device 14 may be configured to normalize each of the one or more measured color values (486). For example, display calibration device 14 may be configured to normalize each of the one or more measured color values by one or more measured values corresponding to a first channel. For example, in an example where the one or more measured color values correspond to the XYZ color space, the X, Y, and Z measured values may be normalized based on the Ys value (e.g., the luminance component of a specified white in the XYZ color space). In this example, display calibration device 14 may be configured to determine the normalized X value by dividing the measured X value by the Ys value. Similarly, display calibration device 14 may be configured to determine the normalized Z value by dividing the measured Z value by the Ys value. Display calibration device 14 may be configured to determine the normalized Y value by dividing the measured Y value by the Ys value, which equals 1. In such an example, the normalized values for three sets of measured XYZ values (X1, Y1, Z1), (X2, Y2, Z2), and (X3, Y3, Z3) may respectively be calculated as (X1/Ys, Y1/Ys, Z1/Ys), (X2/Ys, Y2/Ys, Z2/Ys), and (X3/Ys, Y3/Ys, Z3/Ys).

Display calibration device 14 may be configured to remove compression (e.g., gamma compression) when the input of display data is compressed to obtain uncompressed values corresponding to the input of display data (488). For example, when the input of display data is an R'G'B' image test, display calibration device 14 may be configured to remove gamma compression to obtain linear RGB values corresponding to the non-linear R'G'B' values of the R'G'B' image test.

Display calibration device 14 may be configured to model a mapping (e.g., a relationship) between one or more color values corresponding to the input of display data and one or more measured color values (490). For example, display calibration device 14 may be configured to model a mapping between one or more linear color values in a first color space (e.g., RGB) and one or more measured color values (e.g., one or more normalized measured color values) in a second color space (e.g., XYZ). In this example, display calibration device 14 may be configured to model the performance of the first target display (e.g., target display 23). For example, using normalized measured XYZ values and linear RGB values, display calibration device 14 may be configured to model the performance (e.g., the gamut) of the first target display by modeling a relationship between linear RGB and XYZ values (e.g., normalized XYZ values).

In some examples, the model generated at block 490 may include a polynomial color correction (PCC) response-surface model. For example, the model may include a 3×11 PCC response-surface model that includes eleven coefficients for each color channel in a three channel color space (forming a 3×11 matrix). As another example, the model may include a 3×8 PCC response-surface model that includes eleven coefficients for each color channel in a three channel color space (forming a 3×8 matrix). As another example, the model may include a 3×17 PCC response-surface model that includes eleven coefficients for each color channel in a three channel color space (forming a 3×17 matrix). As another example, display calibration device 14 may be configured to use color values measured in a first color space (e.g., the XYZ color space) and color values in a second color space (e.g., sRGB) corresponding to the input display data to model a mapping of linear first and second color space color values.

Referring to the middle stage of FIG. 4D, display calibration device 14 may be configured to provide an input of display data to a second target display (e.g., target display 21) to be modeled (492). In some examples, the input of display data may include or otherwise be referred to as one or more tests, image tests, color tests, training sets, or modeling sets as described herein (e.g., throughout this disclosure). The display data shown at blocks 482 and 492 may correspond to one or more color tests. The one or more color tests may be the same or different from the left stage and middle stage of method 481. For example, the one or more color tests corresponding to display data at block 482 may be the same as or different from the one or more color tests corresponding to display data at block 492.

For example, display calibration device 14 may be configured to output display data (e.g., one or more image tests) to the second target display (e.g., target display 21). In this example, the display data output by display calibration device 14 constitutes an input of display data to the second target display (e.g., target display 21). In some examples, the input of display data (or, more simply, input) may conform to a color space (e.g., RGB), which may conform to a color specification (e.g., sRGB). In such examples, the input may be linear or non-linear. For example, the input may comprise linear RGB values or non-linear RGB values (e.g., gamma compressed RGB values).

Display calibration device 14 may be configured to measure the second target display (494). For example, display calibration device 14 may be configured to measure the second target display (e.g., target display 21) when display-ing the input of display data. For example, display calibration device 14 may be configured to measure one or more color values displayed by the second target display (e.g., target display 21) when displaying the input of display data. In some examples, the one or more color values may be measured using colorimeter 30. In other examples, the one or more color values may be measured using a colorimeter of a device separate from display calibration device 14. In such examples, display calibration device 14 may be configured to receive one or more measured color values from colorimeter 30 or from the colorimeter of a device separate from display calibration device 14.

In some examples, the one or more color measured color values may refer to values corresponding to light measurement. In such examples, the one or more measured color values may refer to values in the XYZ color space. For example, when the input is an R'G'B' image test (meaning that the image test includes gamma compressed RGB values), display calibration device 14 may be configured to measure the color values displayed by the second target display (e.g., target display 21) when the second target display is displaying the R'G'B' image test. In some examples, any colorimeter (e.g., colorimeter 30 of display calibration device 14 or a colorimeter of a different device) may be configured to measure the color values in the XYZ color space. It is therefore understood that the second target display (e.g., target display 21) may be configured to display input display data corresponding to a first color space while one or more colors displayed by the first target device are measured in a second color space. The first color space described in the left stage of FIG. 4D may be the same as the first color space described with respect to the middle stage of FIG. 4D. Similarly, the second color space described in the left stage of FIG. 4D may be the same as the second color space described with respect to the middle stage of FIG. 4D.

In some examples, the second target display may be configured to display input display data output by display calibration device 14 (or some other device) in a first color space while display calibration device 14 (or some other measuring device) may be configured to measure the input display data presented by the second target display in a second color space. Similarly, it is understood that display calibration device 14 may be configured to output display data in a first color space destined for presentment by the second target display (e.g., target display 21), and that display calibration device 14 may be configured to measure, in a second color space, color values presented by the second target display when presenting the input display data presented by the second target display. As described herein, the colorimeter 30 of display calibration device 14 may be configured to measure displayed color values, and store the measured color values in a memory (e.g., memory 24 or a memory accessible by display calibration device 14).

Display calibration device 14 may be configured to normalize each of the one or more measured color values (496). For example, display calibration device 14 may be configured to normalize each of the one or more measured color values by one or more measured values corresponding to a first channel. For example, in an example where the one or more measured color values correspond to the XYZ color space, the X, Y, and Z measured values may be normalized based on the Ys value (e.g., the luminance component of a specified white in the XYZ color space). In this example, display calibration device 14 may be configured to determine the normalized X value by dividing the measured X value by the Ys value. Similarly, display calibration device 14 may be configured to determine the normalized Z value by dividing the measured Z value by the Ys value. Display calibration device 14 may be configured to determine the normalized Y value by dividing the measured Y value by the Ys value, which equals 1. In such an example, the normalized values for three sets of measured XYZ values (X1, Y1, Z1), (X2, Y2, Z2), and (X3, Y3, Z3) may respectively be calculated as (X1/Ys, Y1/Ys, Z1/Ys), (X2/Ys, Y2/Ys, Z2/Ys), and (X3/Ys, Y3/Ys, Z3/Ys).

Display calibration device 14 may be configured to remove compression (e.g., gamma compression) when the input of display data is compressed to obtain uncompressed values corresponding to the input of display data (498). For example, when the input of display data is an R'G'B' image test, display calibration device 14 may be configured to remove gamma compression to obtain linear RGB values corresponding to the non-linear R'G'B' values of the R'G'B' image test.

Display calibration device 14 may be configured to calculate or otherwise predict one or more color values (500), which may be referred to as the one or more predicted color values. For example, display calibration device 14 may be configured to calculate or otherwise predict one or more color values in the first color space. In such an example, display calibration device 14 may be configured to calculate (e.g., generate) a predicted color value for each of the one or more measured color values by inputting each of the one or more measured color values (e.g., the one or more measured normalized color values) into the first second-order or higher response-surface regression model (i.e., the model generated at block 490). For example, display calibration device 14 may be configured to calculate or otherwise predict one or more color values corresponding to the color space of the input display data described with respect to block 492 using the first model generated at block 490, which maps color values of the second color space (e.g., the XYZ color space) to color values of the first color space (e.g., RGB).

Display calibration device 14 may be configured to model a mapping (e.g., a relationship) between one or more color values corresponding to the input of display data and the one or more predicted color values (502). For example, display calibration device 14 may be configured to model a mapping between one or more linear color values in a first color space (e.g., RGB) and the one or more predicted color values in the first color space. In this example, display calibration device 14 may be configured to model the performance of the second target display (e.g., target display 21) relative to the performance of the performance of the first target display (e.g., target display 23). For example, using the one or more predicted color values (e.g., one or more predicted RGB color values) and linear RGB values corresponding to the display data described with respect to block 492, display calibration device 14 may be configured to generate a second second-order or higher response-surface regression model that maps predicted color values output by the first second-order or higher response-surface regression model corresponding to the first color space to color values corresponding to the first color space. In this example, where the first color space is RGB, an RGB value corresponding to the display data described with respect to block 492 may be input into the second second-order or higher response-surface regression model resulting in an output of a predicted RGB value. By adjusting color values in this manner, an image may be adjusted prior to display to match, approach, or more closely resemble the gamut of the first target display (e.g., target display 23) when displayed by a different display (e.g., display 20).

In some examples, the model generated at block 502 may include a polynomial color correction (PCC) response-surface model. For example, the model may include a 3×11 PCC response-surface model that includes eleven coefficients for each color channel in a three channel color space (forming a 3×11 matrix). As another example, the model may include a 3×8 PCC response-surface model that includes eleven coefficients for each color channel in a three channel color space (forming a 3×8 matrix). As another example, the model may include a 3×17 PCC response-surface model that includes eleven coefficients for each color channel in a three channel color space (forming a 3×17 matrix). The terms of the model generated at block 502 may include one or more second order or higher color value terms corresponding to the first color space. For example, where the first color space is RGB, then second or higher terms may include terms such as R*G, G*B, B*R, R*R, B*B, G*G, R*G*B, R*R*B, B*B*G, R*R*R, and the like. In some examples, the terms of the model generated at block 490 may include one or more second order or higher color value terms corresponding to the second color space. For example, where the second color space is XYZ, then second or higher terms may include terms such as X*Y, Y*Z, Z*X, X*X, Z*Z, Y*Y, X*Y*Z, X*X*Z, Z*Z*Y, X*X*X, and the like.

Display calibration device 14 may be configured to provide (e.g., transmit via a wired or wireless communication medium) the second model (e.g., the model generated at block 502) to display device 12 (504). The arrow between blocks 502 and 510 also depicts that it is the second model that enables color correction (e.g., polynomial color correction). Display device 12 may be configured to store the second model in a memory (e.g., memory 18). In some examples, display calibration device 14 may be configured to store the second model in a memory (e.g., memory 24). In some examples, the model may be referred to as a color adjustment model, color value adjustment model, color correction model, gamut model, a PCC model, and the like. The model may include second order or higher terms.

Display device 12 and/or display 20 (e.g., one or more processors of display device 12 and/or display 20) may be configured to perform color correction (e.g., polynomial color correction) using the model (510). For example, one or more processors of display device 12 may be configured to output display data for display by display 20 (506). The display data may be in the same color space as the input display data displayed by the first and or second target devices (e.g., target display 23 and/or target display 21, respectively) and/or output by display calibration device 14 for presentment by the first and/or second target displays. For example, if the second model generated by display calibration device 14 correlates (e.g., maps) linear RGB values corresponding to the input to predicted linear RGB values, then the display data at block 506 may be in the RGB color space. In such an example, the display data at block 506 may include uncompressed or compressed RGB color values.

Display device 12 and/or display 20 (e.g., one or more processors of display device 12 and/or display 20) may perform input gamma correction (IGC) on display data destined for presentment by display 20 (508). Display device 12 and/or display 20 (e.g., one or more processors of display device 12 and/or display 20) may utilize the second model to adjust one or more color values corresponding to the display data (e.g., all color values corresponding to the display data) (510). For example, for each color value of a color channel input into the model, an adjusted color value is output or otherwise generated. The adjusted color values corresponding to the display data may be referred to as color corrected display data.

Display device 12 and/or display 20 (e.g., one or more processors of display device 12 and/or display 20) may perform panel gamma correction (PGC) on color corrected display data (512). For example, display device 12 and/or display 20 (e.g., one or more processors of display device 12 and/or display 20) may be configured to perform PGC to code luminance or tristimulus values. As another example, display device 12 and/or display 20 (e.g., one or more processors of display device 12 and/or display 20) may be configured to perform PGC to compress RGB values of the image and/or other display data into R'G'B' values. Display 20 may then display images/video using the color corrected display data that has been panel gamma corrected (514).

It is therefore understood that FIG. 4D and the examples discussed in relation thereto present examples illustrating how display calibration device 14 may be configured to calibrate and/or adjust display 20 of display device 12. For example, display calibration device 14 may be configured to calibrate and/or adjust the gamut (e.g., the perceived gamut) of display 20 of display device 12 based on measured performance of one or more target displays (e.g., target display 21 and/or target display 23) according to one or more techniques described with respect to FIG. 4D. For example, display calibration device 14 may be configured to calibrate and/or adjust display 20 of display device 12 by enabling display 20 and/or display device 12 to adjust display data destined for display by display 20 to achieve a different and/or adjusted gamut than would otherwise be displayed absent calibration and/or adjustment according to one or more techniques described with respect to FIG. 4D. As one example, the different or adjusted gamut may correspond to the gamut of at least one target display (e.g., target display 23). As another example, the different or adjusted gamut may be based on measured performance of one or more target displays (e.g., target display 21 and/or target display 23). As another example, display calibration device 14 may be configured to calibrate and/or adjust display 20 of display device 12 by enabling display 20 and/or display device 12 to adjust display data destined for display by display 20 to match, approach, or more closely resemble the gamut of a target display (e.g., target display 23) than would otherwise be displayed absent calibration and/or adjustment according to one or more techniques described with respect to FIG. 4D.

FIG. 5 is an exemplary matrix 550 to perform RGB to XYZ modeling for an exemplary display device according to this disclosure. Matrix 550 illustrates a 3×11 PCC matrix of an RGB to XYZ model for display device 12 using calibration device 14. Matrix 550 shows calculated coefficients $a_{ij}$ for a 3×11 PCC, where i represents the number of the coefficient and j represents the color channel. The 3×11 matrix 550 may be converted to a 3×10 PCC matrix by removing the 0 valued first column and leaving the rest of the values of the 3×11 matrix 550. The values in the matrix that are applied to the input terms in the following models.

An exemplary 3×11 PCC model may contain coefficients $a_{ij}$ for inclusion in the may utilize the following models to predict RGB values for a specified white point:

$$R=a_{01}+a_{11}r+a_{21}g+a_{31}b+a_{41}rg+a_{51}gb+a_{61}br+a_{71}r^2+a_{81}g^2+a_{91}b^2+a_{10,1}rgb$$

$$G=a_{02}+a_{12}r+a_{22}g+a_{32}b+a_{42}rg+a_{52}gb+a_{62}br+a_{72}r^2+a_{82}g^2+a_{92}b^2+a_{10,2}rgb$$

$$B=a_{03}+a_{13}r+a_{23}g+a_{33}b+a_{43}rg+a_{53}gb+a_{63}br+a_{73}r^2+a_{83}g^2+a_{93}b^2+a_{10,3}rgb$$

The capital R, G and B may indicate the resulting values after applying the PCC. The lowercase r, g, b are the input values. Notice that there are three input values that determine three output values (multivariate multiple regression) via 33 coefficients.

A 3×10 PCC model (as may generally be the same as a 3×11 PCC but without the intercept terms:

$$R=a_{11}r+a_{21}g+a_{31}b+a_{41}rg+a_{51}gb+a_{61}br+a_{71}r^2+a_{81}g^2+a_{91}b^2+a_{10,1}rgb$$

$$G=a_{12}r+a_{22}g+a_{32}b+a_{42}rg+a_{52}gb+a_{62}br+a_{72}r^2+a_{82}g^2+a_{92}b^2+a_{10,2}rgb$$

$$B=a_{13}r+a_{23}g+a_{33}b+a_{43}rg+a_{53}gb+a_{63}br+a_{73}r^2+a_{83}g^2+a_{93}b^2+a_{10,3}rgb$$

A 3×10 PCC can be handled as a 3×11 PCC by setting the "$a_0$," terms to zero.

An exemplary 3×8 PCC matrix may contain coefficients $a_{ij}$ for inclusion in the may utilize the following models to predict RGB values for a specified white point:

$$R=a_{01}+a_{11}r+a_{21}g+a_{31}b+a_{41}rg+a_{51}gb+a_{61}br+a_{71}rgb$$

$$R=a_{02}+a_{12}r+a_{22}g+a_{32}b+a_{42}rg+a_{52}gb+a_{62}br+a_{72}rgb$$

$$R=a_{03}+a_{13}r+a_{23}g+a_{33}b+a_{43}rg+a_{53}gb+a_{63}br+a_{73}rgb$$

The 3×8 PCC and 3×11 PCC differ in the $r^2$, $g^2$, and $b^2$ terms. These exemplary models may be utilized to predict the linear RGB values for a specified white point for use on the display device 12 by the display calibration device 14.

Figure 6:
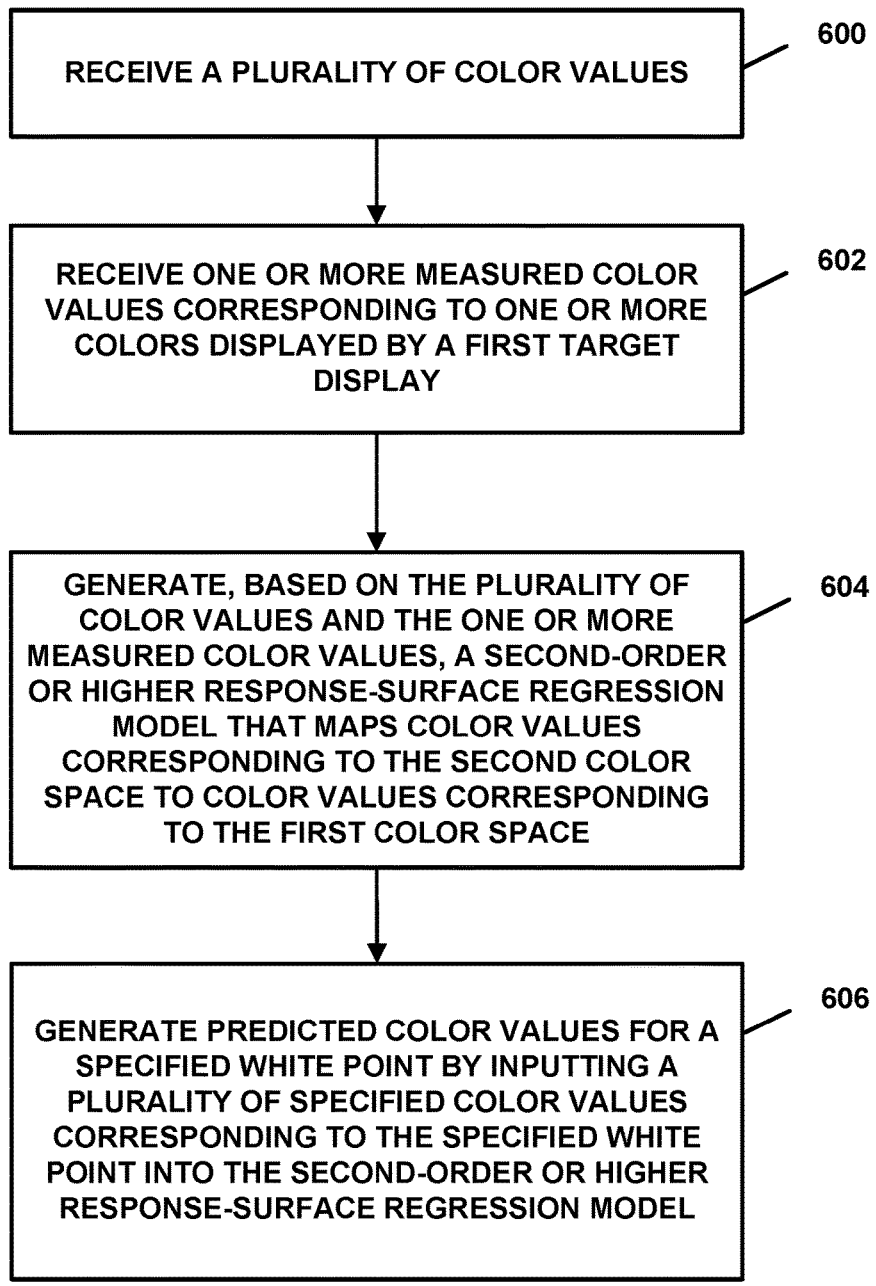
FIG. 6 is a flow diagram illustrating an example display calibration and adjustment technique according to this disclosure.

FIG. 6 illustrates an example display calibration and adjustment technique according to this disclosure. The process of FIG. 6 is generally described as being performed by display calibration device 14 for purposes of illustration, although a variety of other processors and/or devices may also carry out one or more processes shown in FIG. 6.

In the example of FIG. 6, display calibration device 14 may be configured to receive a plurality of color values (600). In some examples, the plurality of color values may correspond to a first color space. Display calibration device 14 may be configured to receive the plurality of color values from a memory (e.g., memory 24) or another device.

Display calibration device 14 may be configured to receive one or more measured color values corresponding to one or more colors displayed by a first target display (602). Display calibration device 14 may be configured to receive the one or more measured color values from a memory (e.g., memory 24) or another device. In some examples, the one or more measured color values may correspond to a second color space. The plurality of color values may be associated with the one or more measured color values. For example, the plurality of color values may be associated with the plurality of measured color values in that the plurality of measured color values may be derived from measuring the plurality of color values as displayed on a display. In some examples, the first target display may refer to target display 21 as described herein.

Display calibration device 14 may be configured to generate, based on the plurality of color values and the one or more measured color values, a second-order or higher response-surface regression model that maps color values corresponding to the second color space to color values corresponding to the first color space (604). Display calibration device 14 may be configured to generate predicted color values for a specified white point by inputting a plurality of specified color values corresponding to the specified white point into the second-order or higher response-surface regression model (606). In some examples, each predicted color value may correspond to the first color space and each of the specified color values may correspond to the second color space. In some examples, the second-order or higher response-surface regression model includes second or third order terms.

Display calibration device 14 may be configured to generate scaling factors based on the predicted color values for the specified white point and the plurality of color values. In some examples, display calibration device 14 may be configured to store the second-order or higher response-surface regression model or the scaling factors in a memory (e.g., memory 24) or a memory accessible to one or more processors of the display calibration device 14. The memory accessible to one or more processors may refer to memory 24 or a memory different than memory 24 that is on or off display calibration device 14. For example, such a memory may include a memory associated with a server to which display calibration device 14 may be configured to transmit data to for storage and receive data therefrom.

In some examples, display calibration device 14 may be configured to generate, for white point calibration during operation of the first target display, the second-order or higher response-surface regression model or the scaling factors in a memory of the first target display, a memory accessible by the first target display, or a memory of a device including the first target display. In such examples, the gamut of the first target display may be adjusted using the second-order or higher response-surface regression model or scaling factors stored in the memory of the first target display to achieve a desired white point. In some examples, the second target display may be display 20 and the first target display may be target display 21. In such examples, the second target display and the first target display are physically different displays. In such examples, the gamut (e.g., white point) of the second target display may be adjusted using the second-order or higher response-surface regression model or scaling factors stored in the memory of the second target display, the memory accessible by the second target display, or the memory of a device including the second target display.

In some examples, display calibration device 14 may be configured to store, for white point calibration during operation of a second target display, the second-order or higher response-surface regression model or the scaling factors in a memory of the second target display, a memory accessible by the second target display, or a memory of a device including the second target display. The second target display may have at least one of a part number, model number, batch number, or identification number in common with the first target display.

In some examples, display calibration device 14 may be configured to receive the plurality of color values from a colorimeter (e.g., colorimeter 30 or a colorimeter different from colorimeter 30 on a different device). In some examples, display calibration device 14 may be configured to receive the one or more measured color values from a colorimeter (e.g., colorimeter 30 or a colorimeter different from colorimeter 30 on a different device). In some examples, display calibration device 14 may be configured to output the one or more colors for display by the first target display.

In some examples, the one or more measured color values may refer to values corresponding to light measurement and the plurality of color values refers to RGB color values. In some examples, the plurality of color values may be user-generated, processor-generated, or stored on a memory accessible to the one or more processors. For example, instead of receiving the plurality of color values from a colorimeter, the plurality of color values may be generated by a user, stored in a memory (e.g., e.g., memory 24) of display calibration device 14, and received from the memory.

Figure 7:
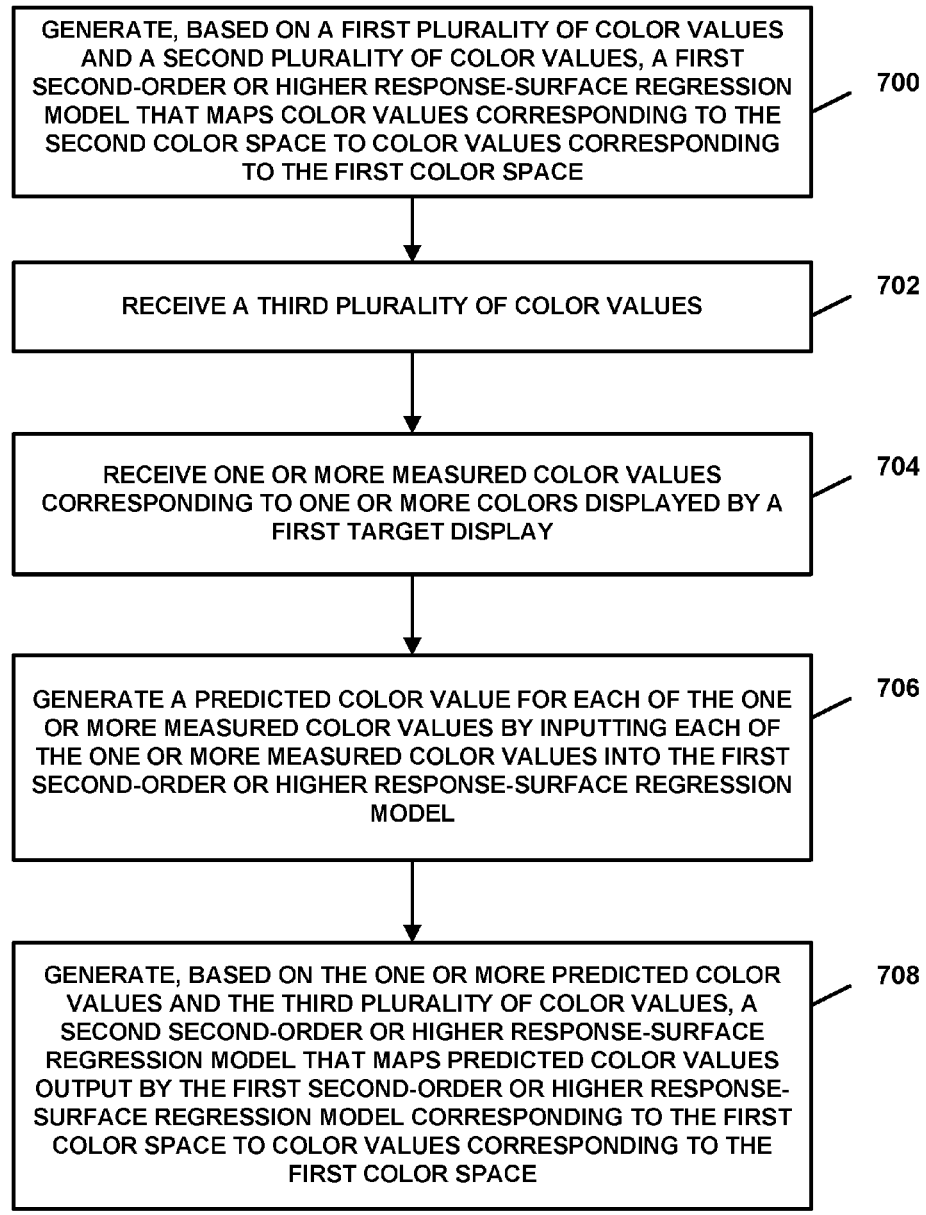
FIG. 7 is a flow diagram illustrating an example display calibration and adjustment technique according to this disclosure.

FIG. 7 illustrates an example display calibration and adjustment technique according to this disclosure. The process of FIG. 7 is generally described as being performed by display calibration device 14 for purposes of illustration, although a variety of other processors and/or devices may also carry out one or more processes shown in FIG. 7.

In the example of FIG. 7, display calibration device 14 may be configured to generate, based on a first plurality of color values and a second plurality of color values, a first second-order or higher response-surface regression model that maps color values corresponding to the second color space to color values corresponding to the first color space (700). In some examples, the first plurality of color values may correspond to a first color space and the second plurality of color values may correspond to a second color space.

Display calibration device 14 may be configured to receive the first and/or second plurality of color values from a memory (e.g., memory 24) or another device. In some examples, the first and/or second plurality of color values may be user-generated, processor-generated, or stored on a memory accessible to the one or more processors. For example, instead of receiving the plurality of color values from a colorimeter, the first and/or plurality of color values may be generated by a user, stored in a memory (e.g., e.g., memory 24) of display calibration device 14, and received from the memory. The second plurality of color values may refer to values corresponding to light measurement and the first plurality of color values may refer to RGB color values.

Display calibration device 14 may be configured to receive a third plurality of color values (702). In some examples, the third plurality of color values may correspond to the first color space. Display calibration device 14 may be configured to receive one or more measured color values corresponding to one or more colors displayed by a first target display (704). In some examples, the one or more measured color values may correspond to the second color space. The third plurality of color values may be associated with the one or more measured color values.

Display calibration device 14 may be configured to generate a predicted color value for each of the one or more measured color values by inputting each of the one or more measured color values into the first second-order or higher response-surface regression model (706). In some examples, each predicted color value corresponds to the first color space.

Display calibration device 14 may be configured to generate, based on the one or more predicted color values and the third plurality of color values, a second second-order or higher response-surface regression model that maps predicted color values output by the first second-order or higher response-surface regression model corresponding to the first color space to color values corresponding to the first color space (708).

In some examples, display calibration device 14 may be configured to store the second second-order or higher response-surface regression model in a memory (e.g., memory 24) or in a memory accessible to one or more processors of display calibration device 14. The memory accessible to one or more processors may refer to memory 24 or a memory different than memory 24 that is on or off display calibration device 14. For example, such a memory may include a memory associated with a server to which display calibration device 14 may be configured to transmit data to for storage and receive data therefrom.

In some examples, display calibration device 14 may be configured to store, for gamut mapping during operation of the first target display, the second second-order or higher response-surface regression model in a memory of the first target display, a memory accessible by the first target display, or a memory of a device including the first target display. In such examples, the gamut of the first target display may be adjusted using the second-order or higher response-surface regression model stored in the memory of the first target display, the memory accessible by the first target display, or the memory of a device including the first target display.

In some examples, display calibration device 14 may be configured to store, for gamut mapping during operation of a second target display, the second second-order or higher response-surface regression model in a memory of the second target display, a memory accessible by the second target display, or a memory of a device including the second target display. The second target display may have at least one of a part number, model number, batch number, or identification number in common with the first target display. In some examples, the second target display may be display 20 and the first target display may be target display 21. In such examples, the second target display and the first target display are physically different displays. In such examples, the gamut of the second target display may be adjusted using the second-order or higher response-surface regression model stored in the memory of the second target display, the memory accessible by the second target display, or the memory of a device including the second target display.

In some examples, display calibration device 14 may be configured to receive the second plurality of color values and/or the one or more measured color values from a colorimeter (e.g., colorimeter 30 or a colorimeter different from colorimeter 30 on a different device). In some examples, display calibration device 14 may be configured to output the one or more colors for display by a second target display (e.g., target display 23). The second plurality of color values may be measured color values derived from measuring one or more colors displayed by the second target display. In some examples, the first and second second-order or higher response-surface regression model include second or third order terms.

Figure 8:
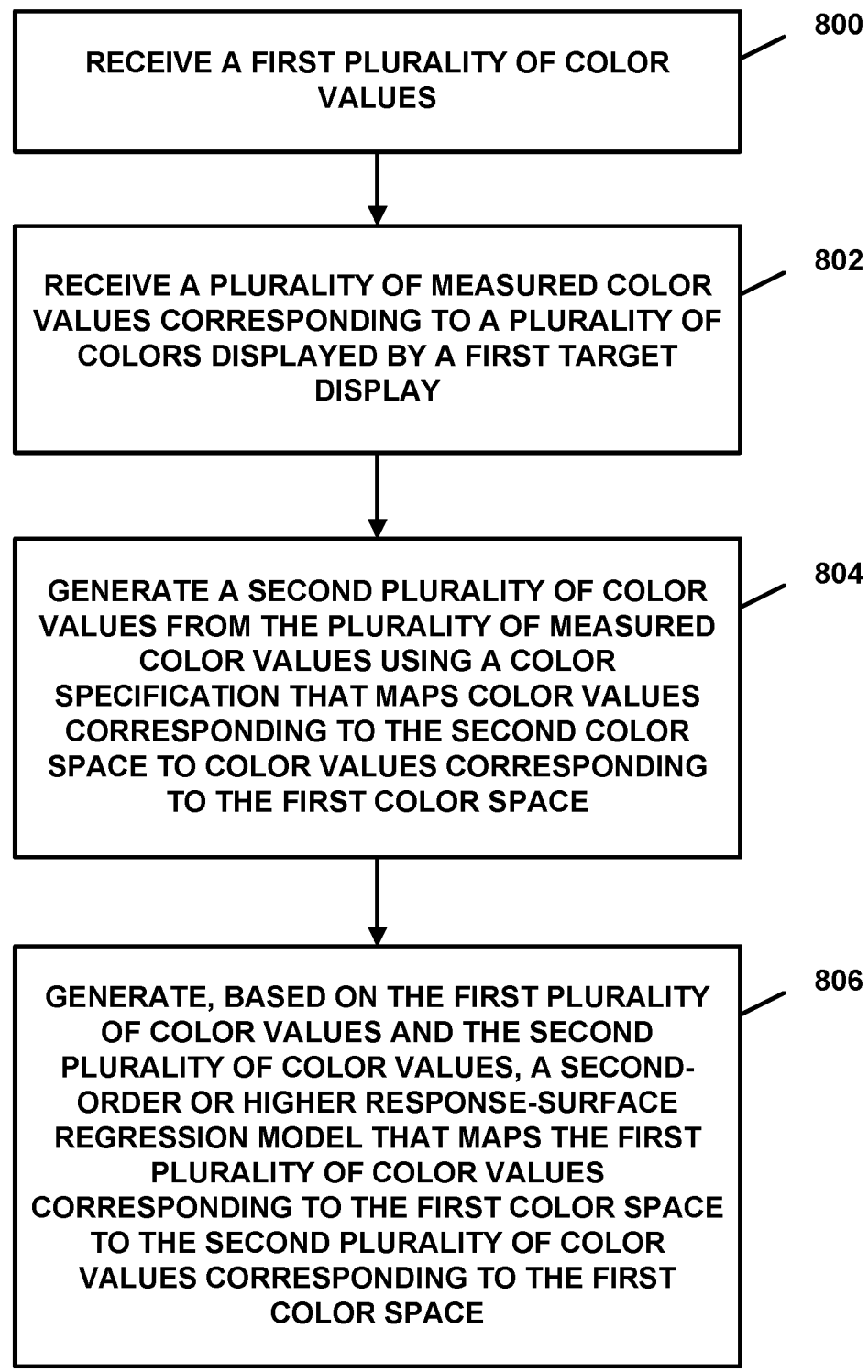
FIG. 8 is a flow diagram illustrating an example display calibration and adjustment technique according to this disclosure.

FIG. 8 illustrates an example display calibration and adjustment technique according to this disclosure. The process of FIG. 8 is generally described as being performed by display calibration device 14 for purposes of illustration, although a variety of other processors and/or devices may also carry out one or more processes shown in FIG. 8.

In the example of FIG. 8, display calibration device 14 may be configured to receive a first plurality of color values (800). In some examples, the first plurality of color values correspond to a first color space. Display calibration device 14 may be configured to receive the first plurality of color values from a memory (e.g., memory 24) or another device. Display calibration device 14 may be configured to receive a plurality of measured color values corresponding to a plurality of colors displayed by a first target display (802). Display calibration device 14 may be configured to receive the plurality of measured color values from a memory (e.g., memory 24) or another device. In some examples, the plurality of measured color values may correspond to a second color space. The first plurality of color values may be associated with the plurality of measured color values. For example, the first plurality of color values may be associated with the plurality of measured color values in that the plurality of measured color values may be derived from measuring the first plurality of color values as displayed on a display. In some examples, the first target display may refer to target display 21 as described herein.

Display calibration device 14 may be configured to generate a second plurality of color values from the plurality of measured color values using a color specification that maps color values corresponding to the second color space to color values corresponding to the first color space (804). In some examples, the second plurality of color values may correspond to the first color space. Display calibration device 14 may be configured to generate, based on the first plurality of color values and the second plurality of color values, a second-order or higher response-surface regression model that maps the first plurality of color values corresponding to the first color space to the second plurality of color values corresponding to the first color space (806).

In some examples, the color specification includes a color standard, such as sRGB. In some examples, display calibration device 14 may be configured to store the second-order or higher response-surface regression model in a memory (e.g., memory 24) or a memory accessible to one or more processors of the display calibration device 14. The memory accessible to one or more processors may refer to memory 24 or a memory different than memory 24 that is on or off display calibration device 14. For example, such a memory may include a memory associated with a server to which display calibration device 14 may be configured to transmit data to for storage and receive data therefrom.

In some examples, display calibration device 14 may be configured to store, for gamut mapping during operation of the first target display, the second-order or higher response-surface regression model in a memory of the first target display, a memory accessible by the first target display, or a memory of a device including the first target display. In such examples, the gamut of the first target display may be adjusted using the second-order or higher response-surface regression model stored in the memory of the first target display, the memory accessible by the first target display, or the memory of a device including the first target display.

In some examples, display calibration device 14 may be configured to store, for gamut mapping during operation of a second target display, the second-order or higher response-surface regression model in a memory of the second target display, a memory accessible by the second target display, or a memory of a device including the second target display. The second target display may have at least one of a part number, model number, batch number, or identification number in common with the first target display. In some examples, the second target display may be display 20 and the first target display may be target display 21. In such examples, the second target display and the first target display are physically different displays. In such examples, the gamut of the second target display may be adjusted using the second-order or higher response-surface regression model stored in the memory of the second target display, the memory accessible by the second target display, or the memory of a device including the second target display.

In some examples, display calibration device 14 may be configured to receive the plurality of measured color values from a colorimeter (e.g., colorimeter 30 or a colorimeter different from colorimeter 30 on a different device). In some examples, display calibration device 14 may be configured to output the one or more colors for display by the first target display. In some examples, display calibration device 14 may be configured to receive the plurality of measured color values from a memory accessible by the one or more processors. In some examples, the second-order or higher response-surface regression model includes second or third order terms.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of gamut mapping comprising:
    receiving, by one or more processors, a first plurality of color values, wherein the first plurality of color values correspond to a first color space;
    receiving, by the one or more processors, a plurality of measured color values corresponding to a plurality of colors displayed by a first target display, wherein the plurality of measured color values correspond to a second color space, and wherein the first plurality of color values are associated with the plurality of measured color values;
    generating, by the one or more processors, a second plurality of color values from the plurality of measured color values using a color specification that maps color values corresponding to the second color space to color values corresponding to the first color space, wherein the second plurality of color values correspond to the first color space; and
    generating, by the one or more processors based on the first plurality of color values and the second plurality of color values, a second-order or higher response-surface regression model that maps the first plurality of color values corresponding to the first color space to the second plurality of color values corresponding to the first color space.

2. The method of claim 1, wherein the color specification includes a color standard.

3. The method of claim 2, wherein the color standard is sRGB.

4. The method of claim 1, wherein at least one calibration tool includes the one or more processors.

5. The method of claim 4, further comprising:
    storing the second-order or higher response-surface regression model in a memory of the at least one calibration tool or in a memory accessible to the one or more processors of the at least one calibration tool.

6. The method of claim 1, further comprising:
    storing, for gamut mapping during operation of the first target display, the second-order or higher response-surface regression model in a memory of the first target display, a memory accessible by the first target display, or a memory of a device including the first target display.

7. The method of claim 6, further comprising:
    gamut mapping the first target display using the second-order or higher response-surface regression model stored in the memory of the first target display, the memory accessible by the first target display, or the memory of a device including the first target display.

8. The method of claim 1, further comprising:
storing, for gamut mapping during operation of a second target display, the second-order or higher response-surface regression model in a memory of the second target display, a memory accessible by the second target display, or a memory of a device including the second target display, wherein the second target display has at least one of a part number, model number, batch number, or identification number in common with the first target display.

9. The method of claim 8, further comprising:
gamut mapping the second target display using the second-order or higher response-surface regression model stored in the memory of the second target display, the memory accessible by the second display, or the memory of a device including the second target display.

10. The method of claim 1, further comprising:
receiving the plurality of measured color values from a colorimeter.

11. The method of claim 1, further comprising:
outputting, by the one or more processors, the one or more colors for display by the first target display.

12. The method of claim 1, further comprising:
receiving, by the one or more processors, the plurality of measured color values from a memory accessible by the one or more processors.

13. The method of claim 1, wherein the second-order or higher response-surface regression model includes second or third order terms.

14. A device comprising:
a memory; and
one or more processors configured to:
receive a first plurality of color values, wherein the first plurality of color values correspond to a first color space;
receive a plurality of measured color values corresponding to a plurality of colors displayed by a first target display, wherein the plurality of measured color values correspond to a second color space, and wherein the first plurality of color values are associated with the plurality of measured color values;
generate a second plurality of color values from the plurality of measured color values using a color specification that maps color values corresponding to the second color space to color values corresponding to the first color space, wherein the second plurality of color values correspond to the first color space;
store the second plurality of color values in the memory; and
generate, based on the first plurality of color values and the second plurality of color values, a second-order or higher response-surface regression model that maps the first plurality of color values corresponding to the first color space to the second plurality of color values corresponding to the first color space.

15. The device of claim 14, wherein the color specification includes a color standard.

16. The device of claim 15, wherein the color standard is sRGB.

17. The device of claim 14, wherein the one or more processors are further configured to:
store the second-order or higher response-surface regression model in the memory;
store the second-order or higher response-surface regression model in a memory of the first target display, a memory accessible by the first target display, or a memory of an apparatus including the first target display; or
store the second-order or higher response-surface regression model in a memory of a second target display, a memory accessible by the second target display, or a memory of an apparatus including the second target display, wherein the second target display has at least one of a part number, model number, batch number, or identification number in common with the first target display.

18. The device of claim 14, wherein the one or more processors are further configured to:
receive the plurality of measured color values from a colorimeter.

19. The device of claim 14, wherein the one or more processors are further configured to:
output the one or more colors for display by the first target display.

20. The device of claim 14, wherein the one or more processors are further configured to:
receive the plurality of measured color values from the memory.

21. The device of claim 14, wherein the second-order or higher response-surface regression model includes second or third order terms.

22. A apparatus comprising:
means for receiving a first plurality of color values, wherein the first plurality of color values correspond to a first color space;
means for receiving a plurality of measured color values corresponding to a plurality of colors displayed by a first target display, wherein the plurality of measured color values correspond to a second color space, and wherein the first plurality of color values are associated with the plurality of measured color values;
means for generating a second plurality of color values from the plurality of measured color values using a color specification that maps color values corresponding to the second color space to color values corresponding to the first color space, wherein the second plurality of color values correspond to the first color space; and
means for generating, based on the first plurality of color values and the second plurality of color values, a second-order or higher response-surface regression model that maps the first plurality of color values corresponding to the first color space to the second plurality of color values corresponding to the first color space.

23. The apparatus of claim 22, wherein the color specification includes a color standard.

24. The apparatus of claim 23, wherein the color standard is sRGB.

25. The apparatus of claim 22, further comprising:
means for storing the second-order or higher response-surface regression model in a memory;
means for storing the second-order or higher response-surface regression model in a memory of the first target display, a memory accessible by the first target display, or a memory of a device including the first target display; or
means for storing the second-order or higher response-surface regression model in a memory of a second target display, a memory accessible by the second target display, or a memory of a device including the second target display, wherein the second target display has at least one of a part number, model number, batch number, or identification number in common with the first target display.

26. The apparatus of claim 22, further comprising:
means for receiving the plurality of measured color values from a colorimeter.

27. The apparatus of claim 22, further comprising:
means for outputting the one or more colors for display by the first target display.

28. The apparatus of claim 22, further comprising:
means for receiving the plurality of measured color values from the memory.

29. The apparatus of claim 22, wherein the second-order or higher response-surface regression model includes second or third order terms.

30. A non-transitory computer-readable storage medium having instructions stored thereon that, when executed, cause one or more processors to:
receive a first plurality of color values, wherein the first plurality of color values correspond to a first color space;

receive a plurality of measured color values corresponding to a plurality of colors displayed by a first target display, wherein the plurality of measured color values correspond to a second color space, and wherein the first plurality of color values are associated with the plurality of measured color values;

generate a second plurality of color values from the plurality of measured color values using a color specification that maps color values corresponding to the second color space to color values corresponding to the first color space, wherein the second plurality of color values correspond to the first color space; and generate, based on the first plurality of color values and the second plurality of color values, a second-order or higher response-surface regression model that maps the first plurality of color values corresponding to the first color space to the second plurality of color values corresponding to the first color space.

* * * * *